(12) United States Patent
Matsuura et al.

(10) Patent No.: US 10,593,989 B2
(45) Date of Patent: Mar. 17, 2020

(54) METHOD FOR MANUFACTURING ALUMINUM PLATE, ALUMINUM PLATE, COLLECTOR FOR STORAGE DEVICE, AND STORAGE DEVICE

(71) Applicant: FUJIFILM Corporation, Tokyo (JP)

(72) Inventors: Atsushi Matsuura, Shizuoka (JP); Yuichi Kasuya, Shizuoka (JP); Junji Kawaguchi, Shizuoka (JP); Hisashi Hotta, Shizuoka (JP); Yoshinori Hotta, Shizuoka (JP); Hiroshi Komatsu, Shizuoka (JP); Hirokazu Sawada, Shizuoka (JP)

(73) Assignee: FUJIFILM Corporation, Minato-ku, Tokyo (JP)

( * ) Notice: Subject to any disclaimer, the term of this patent is extended or adjusted under 35 U.S.C. 154(b) by 126 days.

(21) Appl. No.: 15/187,057

(22) Filed: Jun. 20, 2016

(65) Prior Publication Data
US 2016/0294002 A1    Oct. 6, 2016

Related U.S. Application Data

(63) Continuation of application No. PCT/JP2015/052482, filed on Jan. 29, 2015.

(30) Foreign Application Priority Data

Jan. 31, 2014  (JP) .................. 2014-017244
Mar. 28, 2014  (JP) .................. 2014-070042
Sep. 30, 2014  (JP) .................. 2014-202506

(51) Int. Cl.
*B32B 3/10*   (2006.01)
*C25D 1/08*   (2006.01)
(Continued)

(52) U.S. Cl.
CPC ......... *H01M 10/0525* (2013.01); *C25D 11/18* (2013.01); *C25D 11/20* (2013.01);
(Continued)

(58) Field of Classification Search
None
See application file for complete search history.

(56) References Cited

U.S. PATENT DOCUMENTS 6,224,738 B1    5/2001  Sudduth et al.
6,605,388 B1 *  8/2003  Goda .................. H01M 4/70
                                                        29/2

(Continued)

FOREIGN PATENT DOCUMENTS

CN   103460465 A    12/2013
JP   H07138687 A *   5/1995
(Continued)

OTHER PUBLICATIONS

Yoshii et al., Machine translation of JP 2011-249150 Description, Dec. 8, 2011 (Year: 2011).*
(Continued)

*Primary Examiner* — David Sample
*Assistant Examiner* — Mary I Omori
(74) *Attorney, Agent, or Firm* — Sughrue Mion, PLLC

(57) ABSTRACT

An object of the present invention is to provide a method for manufacturing an aluminum plate which is simple, is high in productiveness, allows the use of arbitrary aluminum materials, and can be suitably used for collectors having excellent adhesiveness to active material layers, a collector for a storage device, and a storage device. The method for manufacturing an aluminum plate of the present invention is a method for manufacturing an aluminum plate having an aluminum substrate having a plurality of through holes in a thickness direction, including an oxidized film-forming step
(Continued)

of forming an oxidized film by carrying out an oxidized film-forming treatment on a surface of the aluminum substrate having a thickness in a range of 5 μm to 1,000 μm and a through hole-forming step of forming through holes by carrying out an electrochemical dissolution treatment after the oxidized film-forming step.

12 Claims, 7 Drawing Sheets

(51) Int. Cl.

| | | |
|---|---|---|
| *H01M 10/0525* | (2010.01) | |
| *C25D 11/24* | (2006.01) | |
| *C25F 3/04* | (2006.01) | |
| *H01G 11/70* | (2013.01) | |
| *H01G 11/84* | (2013.01) | |
| *H01M 4/66* | (2006.01) | |
| *H01M 4/80* | (2006.01) | |
| *H01G 11/68* | (2013.01) | |
| *C25D 11/18* | (2006.01) | |
| *C25D 11/20* | (2006.01) | |
| *H01M 4/04* | (2006.01) | |
| *C23C 18/54* | (2006.01) | |
| *C23C 18/16* | (2006.01) | |
| *C25D 3/38* | (2006.01) | |
| *H01M 4/02* | (2006.01) | |

(52) U.S. Cl.
CPC .............. *C25D 11/24* (2013.01); *C25F 3/04* (2013.01); *H01G 11/68* (2013.01); *H01G 11/70* (2013.01); *H01G 11/84* (2013.01); *H01M 4/044* (2013.01); *H01M 4/0442* (2013.01); *H01M 4/661* (2013.01); *H01M 4/664* (2013.01); *H01M 4/667* (2013.01); *H01M 4/80* (2013.01); *C23C 18/1653* (2013.01); *C23C 18/54* (2013.01); *C25D 3/38* (2013.01); *H01M 2004/021* (2013.01); *Y02E 60/13* (2013.01); *Y02T 10/7011* (2013.01); *Y02T 10/7022* (2013.01)

(56) References Cited

U.S. PATENT DOCUMENTS

| | | | | |
|---|---|---|---|---|
| 2004/0234858 A1* | 11/2004 | Torimae | ................ | H01M 4/136 429/231.95 |
| 2010/0027193 A1 | 2/2010 | Marumo et al. | | |
| 2010/0027195 A1 | 2/2010 | Taguchi et al. | | |
| 2011/0236748 A1* | 9/2011 | Nakashima | ............. | H01M 2/26 429/163 |
| 2012/0256224 A1* | 10/2012 | Hatanaka | ............ | C23C 18/1608 257/98 |
| 2014/0002960 A1* | 1/2014 | Tezuka | ................... | H01G 11/06 361/508 |
| 2014/0004420 A1* | 1/2014 | Hatanaka | ............... | H01M 4/131 429/211 |

FOREIGN PATENT DOCUMENTS

| | | |
|---|---|---|
| JP | 2010-186779 A | 8/2010 |
| JP | 2011-249150 A | 12/2011 |
| JP | 2012-151395 A | 8/2012 |
| JP | 2012-216513 A | 11/2012 |
| JP | 2012-230777 A | 11/2012 |
| JP | 2013-26063 A | 2/2013 |
| JP | 2013-77734 A | 4/2013 |
| JP | 2013-93498 A | 5/2013 |
| WO | 2008/078777 A1 | 7/2008 |
| WO | 2011/004777 A1 | 1/2011 |
| WO | 2012/114502 A1 | 8/2012 |

OTHER PUBLICATIONS

Uesugi et al., machine translation of JPH07138687, May 30, 1995 (Year: 1995).*
UACJ Foil Corporation, Battery Foil, Jul. 4, 2016 (Year: 2016).*
International Search Report of PCT/JP2015/052482 dated Apr. 14, 2015.
Communication dated Apr. 18, 2017, from the State Intellectual Property Office of People's Republic of China in corresponding Application No. 201580005720.X.
Communication dated May 15, 2017, from the European Patent Office in counterpart European application No. 15743341.8.
Communication dated May 9, 2017 issued by the Japanese Patent Office in counterpart Japanese application No. 2015-560005.
International Preliminary Report on Patentability and Written Opinion, dated Aug. 11, 2016, issued in International Application No. PCT/JP2015/052482, 6 pages in English.
H.M. Zheng et al. "The study of porous anodic alumina as template for the pit initiation on electrode aluminum foils" Key Engineering Materials vol. 562-565; Jul. 15, 2013 (5 pages total).
Dongjin Park et al. "Electrochemical Etching of Aluminum through Porous Alumina" Analytical Sciences 2001, vol. 17 Supplement; Mar. 13, 2007 (4 pages total).
Communication dated Feb. 2, 2017, from the European Patent Office in counterpart European Application No. 15743341.8.
Communication dated Jul. 12, 2018, from the European Patent Office in counterpart European Application No. 15743341.8.

* cited by examiner

METHOD FOR MANUFACTURING ALUMINUM PLATE, ALUMINUM PLATE, COLLECTOR FOR STORAGE DEVICE, AND STORAGE DEVICE

CROSS-REFERENCE TO RELATED APPLICATIONS

This application is a Continuation of PCT International Application No. PCT/JP2015/052482 filed on Jan. 29, 2015, which claims priority under 35 U.S.C. § 119(a) to Japanese Patent Application No. 2014-017244 filed on Jan. 31, 2014, Japanese Patent Application No. 2014-070042 filed on Mar. 28, 2014 and Japanese Patent Application No. 2014-202506 filed on Sep. 30, 2014. Each of the above application(s) is hereby expressly incorporated by reference, in its entirety, into the present application.

BACKGROUND OF THE INVENTION

1. Field of the Invention

The present invention relates to a method for manufacturing an aluminum plate, an aluminum plate, a collector for a storage device, and a storage device.

2. Description of the Related Art

In recent years, in response to the development of portable devices such as personal computers and mobile phones, hybrid vehicles, electric vehicles, and the like, the demand for storage devices (particularly, lithium ion capacitors, lithium ion secondary batteries, and electric double layer capacitors) as power supplies has increased.

It is known that, as electrode collectors that are used for positive electrodes or negative electrodes in the above-described storage devices (hereinafter, simply referred to as "the collectors"), aluminum plates are used.

For example, JP2013-077734A describes the use of metal foils having a plurality of through holes as collectors and also describes aluminum, copper, and the like as materials therefor ([Claim 1] and [0021]).

In addition, JP2012-151395A describes the use of film-like collectors having through holes as collectors and also describes the use of aluminum, stainless steel, and the like as positive electrode collectors ([Claim 1] and [0053]).

In addition, JP2010-186779A describes metal foils having a number of through holes formed in places to which active materials are attached as positive and negative electrodes and also describes aluminum foils as positive electrode collectors ([Claim 1] and [0016]).

Similarly, WO2008/078777A describes the use of "collectors made of aluminum etched foils which have a thickness in a range of 20 μm to 45 μm, an apparent density in a range of 2.00 g/cm$^3$ to 2.54 g/cm$^3$, and a number of through holes that penetrate front and rear surfaces having an air permeability in a range of 20 s to 120 s" as coated electrodes ([Claim 1]) and also describes that 80% or more of the through holes in the collectors have hole diameters in a range of 1 μm to 30 μm ([Claim 2]).

In addition, WO2011/004777A describes "an aluminum penetrated foil comprising Fe: 5 weight ppm to 80 weight ppm, Si: 5 weight ppm to 100 weight ppm, and Cu: 10 weight ppm to 100 weight ppm with a remainder being Al and inevitable impurities, wherein (1) a foil thickness is 50 μm or less, (2) a plurality of through holes reaching a rear surface from a foil front surface are provided, and (3) a ratio [c/t] of a vertical through hole occupancy c (%) in the aluminum penetrated foil to the foil thickness t (μm) is 1.4 or greater." ([Claim 1]) and also describes that the inner diameters of the through holes are in a range of 0.2 μm to 5 μm ([Claim 3]).

SUMMARY OF THE INVENTION

The present inventors and the like attempted to manufacture aluminum plates having through holes which can be used for a variety of applications (particularly collectors) and consequently clarified that, in JP2013-077734A, JP2012-151395A, and JP2010-186779A, methods for forming through holes are not clear, and, for example, methods in which aluminum plates are mechanically drilled (for example, punched) or methods in which the crystal alignment of aluminum is used are troublesome and have extremely poor productivity. Furthermore, it was clarified that, although WO2008/078777A and WO2011/004777A describe that through holes are formed by means of etching, there is a tendency of the opening diameters of through holes which are formed by means of etching decreasing, and, when used for collectors, there are cases in which adhesiveness between the surfaces of the collectors and active material layers or undercoats are poor.

Therefore, an object of the present invention is to provide an aluminum plate which is simple, is high in productiveness, allows the use of arbitrary aluminum materials, and can be suitably used for collectors having excellent adhesiveness to active material layers and a method for manufacturing the same, a collector for a storage device, and a storage device.

As a result of intensive studies for achieving the above-described object, the present inventors and the like found that, when an oxidized film-forming treatment and an electrochemical dissolution treatment are carried out on aluminum substrates having a predetermined thickness in this order, it is possible to manufacture aluminum plates having an aluminum substrate having a plurality of through holes in the thickness direction and completed the present invention.

In addition, the present inventors and the like found that, when an oxidized film-forming treatment and an electrochemical dissolution treatment are carried out on aluminum substrates having a predetermined thickness in this order, the average opening diameter of through holes being formed or the proportion of through holes having a predetermined opening diameter falls in a specific range, and thus adhesiveness to active material layers or undercoats becomes favorable and completed the present invention.

That is, it was found that the above-described object can be achieved using the following constitutions.

[1] A method for manufacturing an aluminum plate having an aluminum substrate having a plurality of through holes in a thickness direction, comprising: an oxidized film-forming step of forming an oxidized film by carrying out an oxidized film-forming treatment on a surface of the aluminum substrate having a thickness in a range of 5 μm to 1,000 μm; and a through hole-forming step of forming through holes by carrying out an electrochemical dissolution treatment after the oxidized film-forming step.

[2] The method for forming an aluminum plate according to [1], in which a quantity of electricity (Q) (C/dm$^2$) in the electrochemical dissolution treatment and a total thickness (t) (μm) of the oxidized film and the aluminum substrate during the electrochemical dissolution treatment satisfy Expression (I) below.

$$5 \leq Q/t \leq 300 \qquad (I)$$

[3] The method for forming an aluminum plate according to [1] or [2], comprising: an oxidized film-removing step of removing the oxidized film after the through hole-forming step.

[4] The method for forming an aluminum plate according to any one of [1] to [3], comprising: a roughening treatment step of carrying out an electrochemical roughening treatment on the aluminum substrate that is yet to be subjected to the oxidized film-forming step or the aluminum plate from which the oxidized film after the oxidized film-removing step is removed.

[5] An aluminum plate having an aluminum substrate having a plurality of through holes in a thickness direction, in which an average opening diameter of the through holes is in a range of 0.1 μm to 100 μm, and a proportion of through holes having an opening diameter of 5 μm or smaller in the through holes is 50% or lower.

[6] The aluminum plate according to [5], in which a proportion of through holes having an opening diameter of larger than 30 μm in the through holes is 20% or greater.

[7] The aluminum plate according to [5] or [6], in which an arithmetic average roughness Ra of a surface is 0.2 μm or greater.

[8] The aluminum plate according to any one of [5] to [7], comprising: unpenetrated recessed portions having an average opening diameter in a range of 0.1 μm to 100 μm, in which an occupancy of the recessed portions is 10% or greater.

[9] The aluminum plate according to any one of [5] to [8], in which a specific surface area ΔS of the surface is 5% or larger.

Here, the specific surface area ΔS refers to a value obtained from Expression (i) below using an actual area $S_x$ that is obtained from three-dimensional data, which is obtained by measuring specific surface areas using an atomic force microscope at 512×128 points in a 25 μm×25 μm range on the surface, using a three-point approximation method and a geometric measurement area $S_0$.

$$\Delta S = (S_x - S_0)/S_0 \times 100 (\%) \quad \text{(i)}$$

[10] A collector for a storage device made of an aluminum plate having an aluminum substrate having a plurality of through holes in a thickness direction, in which the aluminum plate is an aluminum plate that is obtained using the method for manufacturing an aluminum plate according to any one of [1] to [4] or an aluminum plate according to any one of [5] to [9].

[11] A storage device comprising: the collector for a storage device according to [10].

As described below, according to the present invention, it is possible to provide a method for manufacturing an aluminum plate, the aluminum plate which is simple, is high in productiveness, and allows the use of arbitrary aluminum materials, the aluminum plate being suitably used for collectors having excellent adhesiveness to active material layers, a collector for a storage device, and a storage device.

BRIEF DESCRIPTION OF THE DRAWINGS

FIGS. 1A to 1E illustrate schematic sectional views illustrating an example of a preferred embodiment of a method for manufacturing an aluminum plate of the present invention, in which FIG. 1A is a schematic sectional view of an aluminum substrate, FIG. 1B is a schematic sectional view illustrating a state in which an oxidized film-forming treatment is carried out on the aluminum substrate so as to form an oxidized film, FIG. 1C is a schematic sectional view illustrating a state in which an electrochemical dissolution treatment is carried out after the oxidized film-forming treatment so as to form through holes in the aluminum substrate and the oxidized film, FIG. 1D is a schematic sectional view illustrating a state after the oxidized film is removed following the electrochemical dissolution treatment, and FIG. 1E is a schematic sectional view illustrating a state after an electrochemical roughening treatment is further carried out following the removal of the oxidized film.

FIGS. 2A to 2E illustrate schematic sectional views illustrating another example of the preferred embodiment of the method for manufacturing an aluminum plate of the present invention, in which FIG. 2A is a schematic sectional view of an aluminum substrate, FIG. 2B is a schematic sectional view illustrating a state in which the oxidized film-forming treatment is carried out on the aluminum substrate so as to form oxidized films on a front surface and a rear surface, FIG. 2C is a schematic sectional view illustrating a state in which the electrochemical dissolution treatment is carried out after the oxidized film-forming treatment so as to form through holes in the aluminum substrate and the oxidized films, FIG. 2D is a schematic sectional view illustrating a state after the oxidized films are removed following the electrochemical dissolution treatment, and FIG. 2E is a schematic sectional view illustrating a state after the electrochemical roughening treatment is further carried out following the removal of the oxidized films.

FIGS. 3A and 3B illustrate schematic sectional views of aluminum plates that are produced using another embodiment of the method for manufacturing an aluminum plate of the present invention, in which FIG. 3A is a schematic sectional view illustrating a state in which inner walls of the through holes in the aluminum substrate illustrated in FIG. 2C are coated with a metal other than aluminum, and FIG. 3B is a schematic sectional view illustrating a state in which surfaces including the inner walls of the through holes in the aluminum substrate illustrated in FIG. 1D or FIG. 2D are coated with a metal other than aluminum.

DESCRIPTION OF THE PREFERRED EMBODIMENTS

Figure 1A:
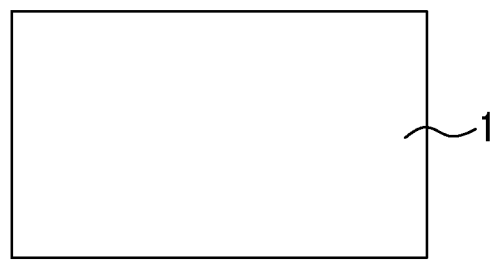
Figure 1B:
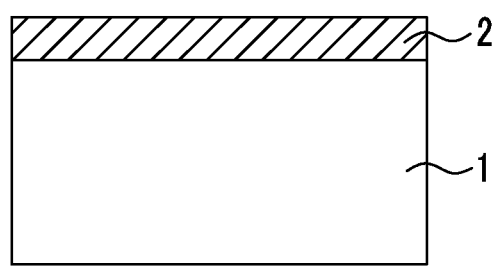
Figure 1C:
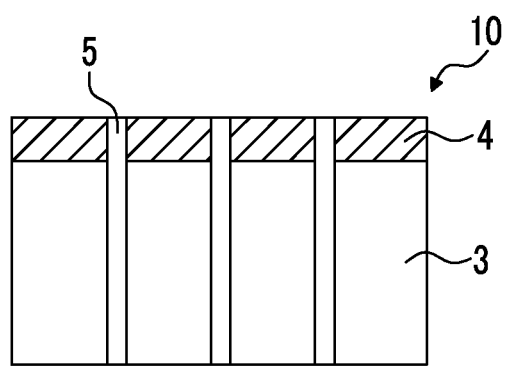

Hereinafter, the present invention will be described in detail.

In the following description, there are cases in which constitutional requirements will be described on the basis of typical embodiments of the present invention, but the present invention is not limited to the above-described embodiments.

Meanwhile, in the present specification, numeric ranges expressed using "to" include numeric values before and after "to" as the lower limit value and the upper limit value.

[Method for Manufacturing Aluminum Plate]

A method for manufacturing an aluminum plate of the present invention (hereinafter, also abbreviated as "the manufacturing method of the present invention") is a method for manufacturing an aluminum plate having an aluminum substrate having a plurality of through holes in a thickness direction, including an oxidized film-forming step of forming an oxidized film by carrying out an oxidized film-forming treatment on the surface of the aluminum substrate having a thickness in a range of 5 μm to 1,000 μm and a through hole-forming step of forming through holes by carrying out an electrochemical dissolution treatment (hereinafter, also abbreviated as "the electrolytic dissolution treatment") after the oxidized film-forming step.

Here, "aluminum plates having an aluminum substrate having a plurality of through holes in a thickness direction" which are manufactured using the manufacturing method of the present invention and "aluminum plates" described in the section of an aluminum plate of the present invention which will be described below may be aluminum plates having an aluminum substrate having a plurality of through holes in the thickness direction and an oxidized film having a plurality of through holes in the thickness direction or aspects in which the oxidized film is removed from the aluminum plate using an oxidized film-removing step described below, that is, aluminum plates made of an aluminum substrate having a plurality of through holes in the thickness direction.

In the present invention, when the oxidized film-forming step and the through hole-forming step are provided, it is possible to manufacture an aluminum plate which is simple, is high in productiveness, allows the use of arbitrary aluminum materials, and can be suitably used for collectors having excellent adhesiveness to active material layers.

The reasons therefor are not clear in detail, but the present inventors and the like presume the reasons as described below.

That is, it is considered to be because through holes can be easily formed by means of the electrolytic dissolution treatment from, as starting points, intermetallic compounds which are generated due to the oxidized film-forming treatment and are present on the surface of the aluminum substrate or the interface between the aluminum substrate and the oxidized film or defects, uneven shapes, and the like in the oxidized film which are generated due to the oxidized film-forming treatment.

In addition, it is considered that, as described below, the average opening diameter of through holes being formed or the proportion of through holes having a predetermined opening diameter falls in a specific range, and thus it becomes easy for active materials, binders, and conductive assistants to link together through through holes in collectors, and adhesiveness between the collectors and active material layers or undercoats improves.

Next, the respective steps of the manufacturing method of the present invention will be described using FIGS. 1 and 2, and then the respective steps will be described in detail.

FIGS. 1 and 2 are schematic sectional views illustrating examples of a preferred embodiment of the manufacturing method of the present invention.

As illustrated in FIGS. 1 and 2, the manufacturing method of the present invention is a manufacturing method having an oxidized film-forming step of forming an oxidized film 2 by carrying out an oxidized film-forming step on the surface(s) (the front surface and the rear surface in the aspect illustrated in FIGS. 2A to 2E) of an aluminum substrate 1 (FIG. 1A and FIG. 1B and FIG. 2A and FIG. 2B) and a through hole-forming step of forming through holes 5 by carrying out an electrolytic dissolution treatment after the oxidized film-forming step, thereby producing an aluminum plate 10 having an aluminum substrate 3 having through holes and an oxidized film(s) 4 having through holes (FIG. 1B and FIG. 1C and FIG. 2B and FIG. 2C).

In addition, as illustrated in FIGS. 1A to 1E and FIGS. 2A to 2E, the manufacturing method of the present invention preferably has an oxidized film-removing step of removing the oxidized film(s) 4 having through holes, thereby producing the aluminum plate 10 made of the aluminum substrate 3 having through holes after the through hole-forming step (FIG. 1C and FIG. 1D and FIG. 2C and FIG. 2D).

Similarly, as illustrated in FIGS. 1 and 2, the manufacturing method of the present invention preferably has a roughening treatment step of carrying out an electrochemical roughening treatment on the aluminum substrate 3 having through holes, thereby producing the aluminum plate 10 having a roughened surface after the oxidized film-removing step (FIG. 1D and FIG. 1E and FIG. 2D and FIG. 2E). Meanwhile, FIGS. 1A to 1E and FIGS. 2A to 2E illustrate aspects in which the electrochemical roughening treatment is carried out after the oxidized film-removing step, but the manufacturing method of the present invention may have an aspect in which the electrochemical roughening treatment is carried out on the aluminum substrate that is yet to be subjected to the oxidized film-forming step, and then the oxidized film-forming step, the through hole-forming step, and the oxidized film-removing step are provided.

[Oxidized Film-Forming Step]

The oxidized film-forming step in the manufacturing method of the present invention is a step in which an oxidized film-forming treatment is carried out on the surface of an aluminum substrate having a thickness in a range of 5 m to 1,000 μm, thereby forming an oxidized film.

<Aluminum Substrate>

The aluminum substrate is not particularly limited as long as the thickness thereof is in a range of 5 μm to 1,000 μm, and, as well-known aluminum substrates, it is possible to use pure aluminum-based substrates (for example, 1N30 material, 1085 material, and the like), 3000-based substrates (for example, 3003 material and the like), 8000-based substrates (for example, 8021 material and the like), and the like.

In addition, the thickness of the aluminum substrate is in a range of 5 μm to 1,000 μm, preferably in a range of 5 μm to 200 μm, more preferably in a range of 5 μm to 50 μm, and still more preferably in a range of 10 μm to 30 μm.

In addition, the number of the intermetallic compounds in the aluminum substrate is preferably in a range of 1,000 compounds/mm$^2$ to 1,000,000 compounds/mm$^2$, more preferably in a range of 5,000 compounds/mm$^2$ to 800,000 compounds/mm$^2$, and still more preferably in a range of 10,000 compounds/mm$^2$ to 500,000 compounds/mm$^2$.

<Oxidized Film-Forming Treatment>

The above-described oxidized film-forming treatment is not particularly limited, and it is possible to carry out, for example, the same treatment as well-known anodization of the related art.

As the anodization, it is possible to employ, for example, conditions or devices described in Paragraphs "0063" to "0073" of JP2012-216513A.

In the present invention, the conditions of anodization vary in diverse manners depending on electrolytic solutions being used and thus cannot be determined uniformly; however, generally, the concentration of an electrolytic solution in a range of 1% by mass to 80% by mass, the liquid temperature in a range of 5° C. to 70° C., the current density in a range of 0.5 A/dm$^2$ to 60 A/dm$^2$, the voltage in a range of 1 V to 100 V, and the electrolysis duration in a range of 1 second to 20 minutes are appropriate and are adjusted so as to obtain a desired amount of oxidized film.

In the present invention, anodization which is carried out in a sulfuric acid solution is preferred.

In a case in which anodization is carried out in an electrolytic solution containing sulfuric acid, direct current or alternating current may be applied between the aluminum substrate and a counter electrode. In a case in which direct current is applied to the aluminum substrate, the current density is preferably 1 A/dm$^2$ to 60 A/dm$^2$ and more preferably in a range of 5 A/dm$^2$ to 40 A/dm$^2$. In a case in which anodization is continuously carried out at a high speed, it is preferable to control current to flow at a low current density in a range of 5 A/dm$^2$ to 10 A/dm$^2$ in the initial phase of the anoidization so as to prevent the concentration of the current in a part of the aluminum substrate and the resulting occurrence of so-called "burning" and increase the current density to a range of 30 A/dm$^2$ to 50 A/dm$^2$ or higher as the anodization proceeds. In a case in which anodization is carried out continuously, the anodization is preferably carried out using a liquid power feeding method in which power is fed to the aluminum substrate through an electrolytic solution.

In the present invention, the amount of the oxidized film being formed by means of anodization is preferably in a range of 0.05 g/m$^2$ to 50 g/m$^2$ and more preferably in a range of 0.1 g/m$^2$ to 10 g/m$^2$.

[Through Hole-Forming Step]

The through hole-forming step in the manufacturing method of the present invention is a step in which an electrolytic dissolution treatment is carried out after the oxidized film-forming step, thereby forming through holes.

<Electrolytic Dissolution Treatment>

The above-described electrolytic dissolution treatment is not particularly limited, and it is possible to use direct current or alternating current and use an acidic solution as an electrolytic solution. Among acidic solutions, an electrolytic solution including hydrochloric acid or nitric acid as a main body is preferably used.

In the present invention, as the acidic solution which is the electrolytic solution, it is possible to use, in addition to nitric acid and hydrochloric acid, electrolytic solutions described in the respective specifications of U.S. Pat. Nos. 4,671,859A, 4,661,219A, 4,618,405A, 4,600,482A, 4,566,960A, 4,566,958A, 4,566,959A, 4,416,972A, 4,374,710A, 4,336,113A, and 4,184,932A.

The concentration of the acidic solution is preferably in a range of 0.5% by mass to 2.5% by mass and more preferably in a range of 0.7% by mass to 2.0% by mass. In addition, the liquid temperature of the acidic solution is preferably in a range of 20° C. to 80° C. and more preferably in a range of 30° C. to 60° C.

In addition, as an aqueous solution including hydrochloric acid or nitric acid as a main body, it is possible to use an aqueous solution obtained by adding at least one of a nitric acid compound having nitric acid ions such as aluminum nitrate, sodium nitrate, or ammonium nitrate or a hydrochloric acid compound having hydrochloric acid ions such as aluminum chloride, sodium chloride, or ammonium chloride to an aqueous solution of hydrochloric acid or nitric acid which has a concentration of 1 g/L to 100 g/L so as to obtain a concentration in a range of 1 g/L to saturation.

In addition, the aqueous solution including hydrochloric acid or nitric acid as the main body may contain metals which are included in an aluminum alloy such as iron, copper, manganese, nickel, titanium, magnesium, and silica. A liquid obtained by adding aluminum chloride, aluminum nitrate, or the like to an aqueous solution of hydrochloric acid or nitric acid having a concentration in a range of 0.5% by mass to 2% by mass so that the concentration of aluminum ions falls in a range of 3 g/L to 50 g/L is preferably used.

In the electrochemical dissolution treatment, direct current is mainly used; however, in a case in which alternating current is used, the alternating-current power source wave is not particularly limited, and a sine wave, a square wave, a trapezoidal wave, a triangular wave, and the like can be used, and, among these, a square wave or a trapezoidal wave is preferred, and a trapezoidal wave is particularly preferred.

(Nitric Acid Electrolysis)

In the present invention, it is possible to easily form through holes which have an average opening diameter in a range of 1 μm to 100 μm and an average aperture in a range of 0.5% to 60% by means of an electrochemical dissolution treatment in which an electrolytic solution including nitric acid as a main body is used (hereinafter, also abbreviated as "the nitric acid dissolution treatment").

Here, the nitric acid dissolution treatment is preferably an electrolysis treatment which is carried out using direct current under conditions of an average current density set to 5 A/dm$^2$ or higher and a quantity of electricity set to 50 C/dm$^2$ or greater since it is easy to control dissolution points which serve as starting points of through hole formation. Meanwhile, the average current density is preferably 100 A/dm$^2$ or lower, and the quantity of electricity is preferably 10,000 C/dm$^2$ or less.

In addition, the nitric acid concentration or temperature of the electrolytic solution in the nitric acid electrolysis is not particularly limited, and it is possible to carry out electrolysis using a nitric acid electrolytic solution having a high concentration, for example, a nitric acid concentration in a range of 15% by mass to 35% by mass at 30° C. to 60° C. or carry out electrolysis using a nitric acid electrolytic solution having a nitric acid concentration in a range of 0.7% by mass to 2% by mass at a high temperature, for example, at 80° C. or higher.

(Hydrochloric Acid Electrolysis)

In the present invention, it is also possible to easily form through holes which have an average opening diameter in a range of 1 μm to 100 μm and an average aperture in a range of 0.5% to 60% by means of an electrochemical dissolution treatment in which an electrolytic solution including hydrochloric acid as a main body is used (hereinafter, also abbreviated as "the hydrochloric acid dissolution treatment").

Here, the hydrochloric acid dissolution treatment is preferably an electrolysis treatment which is carried out using direct current under conditions of an average current density set to 5 A/dm$^2$ or higher and a quantity of electricity set to 50 C/dm$^2$ or greater since it is easy to control dissolution points of through hole formation. Meanwhile, the average current density is preferably 100 A/dm$^2$ or lower, and the quantity of electricity is preferably 10,000 C/dm$^2$ or less.

In addition, the hydrochloric acid concentration or temperature of the electrolytic solution is not particularly limited, and it is possible to carry out electrolysis using a hydrochloric acid electrolytic solution having a high concentration, for example, a hydrochloric acid concentration in a range of 10% by mass to 35% by mass at 30° C. to 60° C. or carry out electrolysis using a hydrochloric acid electrolytic solution having a hydrochloric acid concentration in a range of 0.7% by mass to 2% by mass at a high temperature, for example, at 80° C. or higher.

In the present invention, it is possible to set the average opening diameter of the through holes to 5 μm or larger, and, since the aperture can also be adjusted to be 5% or greater, the quantity of electricity (Q) (C/dm$^2$) in the electrolytic dissolution treatment and the total thickness (t) (μm) of the oxidized film and the aluminum substrate during the electrolytic dissolution treatment preferably satisfy Expression (I) below and more preferably satisfy Expression (II) below.

$$5 \leq Q/t \leq 300 \quad (I)$$

$$10 \leq Q/t \leq 300 \quad (II)$$

This is considered to be because, when Expression (1) is satisfied, the elution of the oxidized film and the aluminum substrate due to the electrolytic dissolution treatment falls into a preferred state with respect to the thickness.

Meanwhile, in the manufacturing method of the present invention, the total thickness (t) of the oxidized film and the aluminum substrate during the electrolytic dissolution treatment basically becomes the same value as the thickness of the aluminum substrate that is yet to be subjected to the above-described oxidized film-forming treatment.

[Oxidized Film-Removing Step]

The arbitrary oxidized film-removing step which the manufacturing method of the present invention may have is a step of removing the oxidized film.

In the oxidized film-removing step of the manufacturing method of the present invention, the oxidized film can be removed by carrying out, for example, an acid etching treatment, an alkali etching treatment, both of which will be described below, or a combination of both treatments.

<Acid Etching Treatment>

The above-described dissolution treatment is a treatment in which the oxidized film is dissolved using a solution that dissolves the oxidized film (aluminum oxide) earlier than aluminum (hereinafter, referred to as "the alumina dissolution liquid").

Here, the alumina dissolution liquid is preferably an aqueous solution including at least one selected from a group consisting of, for example, chromium compounds, nitric acid, sulfuric acid, phosphoric acid, zirconium-based compounds, titanium-based compounds, lithium salts, cerium salts, magnesium salts, sodium silicofluoride, zinc fluoride, manganese compounds, molybdenum compounds, magnesium compounds, barium compounds, and halogen single bodies.

Specific examples of the chromium compounds include chromium (III) oxide, anhydrous chromium (VI) acid, and the like.

Examples of the zirconium-based compounds include ammonium fluorozirconate, zirconium fluoride, and zirconium chloride.

Examples of the titanium compounds include titanium oxide and titanium sulfide.

Examples of the lithium salts include lithium fluoride and lithium chloride.

Examples of the cerium salts include cerium fluoride and cerium chloride.

Examples of the magnesium salts include magnesium sulfide.

Examples of the manganese compounds include sodium permanganate and calcium permanganate.

Examples of the molybdenum compounds include sodium molybdate.

Examples of the magnesium compounds include magnesium fluoride.pentahydrate.

Examples of the barium compounds include barium oxide, barium acetate, barium carbonate, barium chlorate, barium chloride, barium fluoride, barium iodide, barium lactate, barium oxalate, barium perchlorate, barium selenate, barium selenite, barium stearate, barium sulfite, barium titanate, barium hydroxide, barium nitrate, hydrates thereof, and the like.

Among the above-described barium compounds, barium oxide, barium acetate, and barium carbonate are preferred, and barium oxide is particularly preferred.

Examples of the halogen single bodies include chlorine, fluorine, and bromine.

Among these, the alumina dissolution liquid is preferably an aqueous solution containing an acid, examples of the acid include sulfuric acid, phosphoric acid, nitric acid, hydrochloric acid, and the like, and the acid may be a mixture of two or more acids.

The concentration of the acid is preferably 0.01 mol/L or higher, more preferably 0.05 mol/L or higher, and still more preferably 0.1 mol/L or higher. There is no particular upper limit, and the upper limit is generally 10 mol/L or lower and more preferably 5 mol/L or lower.

The dissolution treatment is carried out by bringing the aluminum substrate on which the oxidized film is formed into contact with the above-described alumina dissolution liquid. A method for bringing the aluminum substrate into contact with the alumina dissolution liquid is not particularly limited, and examples thereof include a dipping method and a spraying method. Among these, the dipping method is preferred.

The dipping method is a treatment in which the aluminum substrate on which the oxidized film is dipped into the above-described alumina dissolution liquid. During the dipping treatment, it is preferable to carry out stirring since the treatment is carried out evenly.

The duration of the dipping treatment is preferably in a range of 1 second to 120 seconds, more preferably in a range of 10 seconds to 100 seconds, and particularly preferably in a range of 20 seconds to 80 seconds.

<Alkali Etching Treatment>

The alkali etching treatment is a treatment in which the oxidized film is dissolved by being brought into contact with an alkali solution.

Examples of alkalis that can be used in the alkali solution include caustic alkalis and alkali metal salts. Specific examples of caustic alkalis include caustic soda and caustic potash. In addition, examples of alkali metal salts include alkali metal silicates such as sodium metasilicate, sodium silicate, potassium metasilicate, and potassium silicate; alkali metal carbonates such as sodium carbonate and potassium carbonate; alkali metal aluminate such as sodium aluminate and potassium aluminate; alkali metal aldonates such as sodium gluconate and potassium gluconate; and alkali metal hydrogenphosphate such as sodium diphosphate, potassium diphosphate, sodium triphosphate, and potassium triphosphate. Among these, solutions of caustic alkalis and solutions containing both caustic alkali and alkali metal aluminate are preferred from the viewpoint of the fast etching rates and the cheap prices. Particularly, an aqueous solution of caustic soda is preferred.

The concentration of the alkali solution is preferably in a range of 0.1% by mass to 50% by mass and more preferably in a range of 0.5% by mass to 10% by mass. In a case in which the alkali solution has aluminum ions dissolved therein, the concentration of aluminum ions is preferably in a range of 0.01% by mass to 10% by mass and more preferably in a range of 0.1% by mass to 3% by mass. The temperature of the alkali solution is preferably in a range of 10° C. to 90° C. The treatment duration is preferably in a range of 1 second to 120 seconds, more preferably in a range of 10 seconds to 90 seconds, and particularly preferably in a range of 20 seconds to 60 seconds.

Meanwhile, the above-described acid etching treatment may be carried out after the alkali etching treatment, and, in this case, the immersion duration in the acid etching treatment is preferably in a range of 1 second to 120 seconds, more preferably in a range of 10 seconds to 100 seconds, and particularly preferably in a range of 20 seconds to 80 seconds.

Examples of a method for bringing the oxidized film into contact with the alkali solution include a method in which the aluminum substrate on which the oxidized film is formed is passed through a tank including the alkali solution, a method in which the aluminum substrate on which the oxidized film is formed is immersed in a tank including the alkali solution, and a method in which the alkali solution is sprayed to the surface (the oxidized film) of the aluminum substrate on which the oxidized film is formed.

[Roughening Treatment Step]

The arbitrary roughening treatment step which the manufacturing method of the present invention may have is a step of roughening the front surface or the rear surface of the aluminum substrate by carrying out an electrochemical roughening treatment (hereinafter, also abbreviated as "the electrolytic roughening treatment") on the aluminum substrate from which the oxidized film is removed.

When the above-described electrolytic roughening treatment is carried out, adhesiveness to active material layers or undercoats further improves, and an increase in the surface area leads to an increase in the contact area, and thus the capacity maintenance rate, output characteristics, and cycle characteristics of storage devices (particularly, lithium ion secondary batteries, lithium ion capacitors, and the like) in which aluminum plates (collectors) obtained using the manufacturing method of the present invention are used enhance.

In the electrolytic roughening treatment, it is possible to appropriately employ, for example, conditions or devices described in Paragraphs "0041" to "0050" of JP2012-216513A.

<Nitric Acid Electrolysis>

In the present invention, it is possible to easily form recessed portions having an average opening diameter in a range of 0.5 μm to 3.0 μm at a density of 10 recess portions/100 μm² or higher by means of an electrochemical roughening treatment in which an electrolytic solution including nitric acid as a main body is used (hereinafter, also abbreviated as "the nitric acid electrolysis").

Here, the nitric acid electrolysis is preferably an electrolysis treatment which is carried out using alternating current under conditions of a peak current density set to 30 A/dm² or higher, an average current density set to 13 A/dm² or higher, and a quantity of electricity set to 150 C/dm² or greater since it becomes possible to form uniform recessed portions at a high density. Meanwhile, the peak current density is preferably 100 A/dm² or lower, the average current density is preferably 40 A/dm² or lower, and the quantity of electricity is preferably 400 C/dm² or less.

In addition, the concentration or temperature of the electrolytic solution in the nitric acid electrolysis is not particularly limited, and it is possible to carry out electrolysis using a nitric acid electrolytic solution having a high concentration, for example, a nitric acid concentration in a range of 15% by mass to 35% by mass at 30° C. to 60° C. or carry out electrolysis using a nitric acid electrolytic solution having a nitric acid concentration in a range of 0.7% by mass to 2% by mass at a high temperature, for example, at 80° C. or higher.

<Hydrochloric Acid Electrolysis>

In the present invention, it is possible to form recessed portions having an average opening diameter in a range of 0.5 μm to 3.0 μm at a density of 10 recess portions/100 μm² or higher by means of an electrochemical roughening treatment in which an electrolytic solution including hydrochloric acid as a main body is used (hereinafter, also abbreviated as "the hydrochloric acid electrolysis").

Here, the hydrochloric acid electrolysis is preferably an electrolysis treatment which is carried out using alternating current under conditions of a peak current density set to 30 A/dm² or higher, an average current density set to 13 A/dm² or higher, and a quantity of electricity set to 150 C/dm² or greater since it becomes possible to form uniform recessed portions at a high density. Meanwhile, the peak current density is preferably 100 A/dm² or lower, the average current density is preferably 40 A/dm² or lower, and the quantity of electricity is preferably 400 C/dm² or less.

[Metal Coating Step]

The manufacturing method of the present invention preferably has a metal coating step in which part or all of the surfaces of the aluminum substrate including at least the inner walls of the through holes are coated with a metal other than aluminum after the above-described through hole-forming step since it is possible to adjust the average opening diameter of the through holes formed by means of the above-described electrolytic dissolution treatment to be small in a range of approximately 0.1 μm to 20 μm.

For the same reason, the manufacturing method of the present invention preferably has a metal coating step in which part or all of the surfaces of the aluminum substrate including at least the inner walls of the through holes are coated with a metal other than aluminum after the above-described oxidized film-removing step.

Here, "part or all of the surfaces of the aluminum substrate including at least the inner walls of the through holes are coated with a metal other than aluminum" means that, out of all the surfaces of the aluminum substrate including the inner walls of the through holes, at least the inner walls of the through holes are coated, and the surfaces other than the inner walls may not be coated or may be wholly or partially coated.

Hereinafter, the metal coating step will be described using FIGS. 3A and 3B.

Figure 3A:
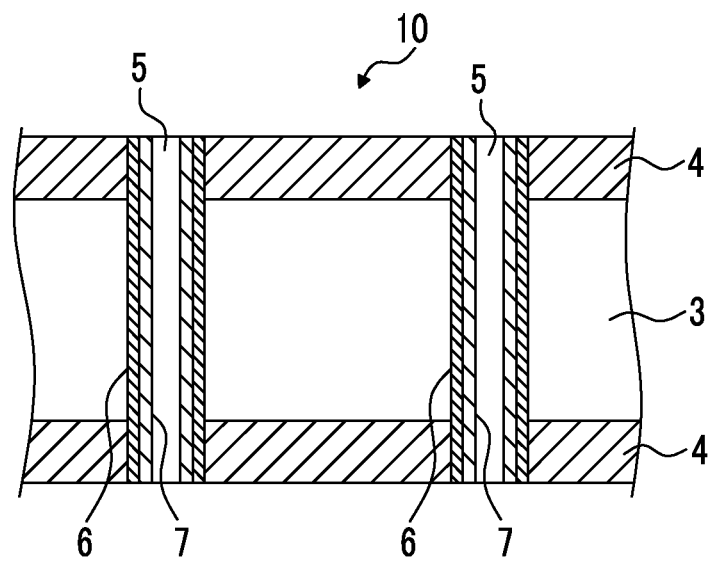
Figure 3B:
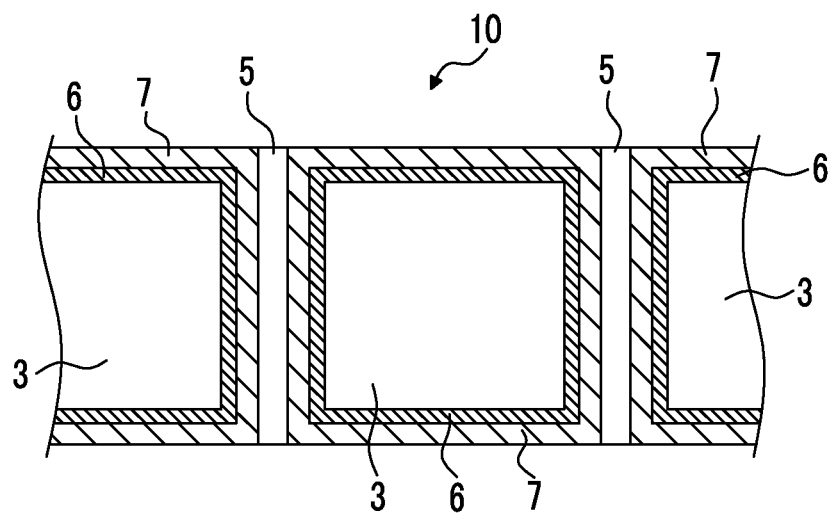

FIGS. 3A and 3B illustrate schematic sectional views of aluminum plates that are produced using another embodiment of the method for manufacturing an aluminum plate of the present invention.

Figure 2A:
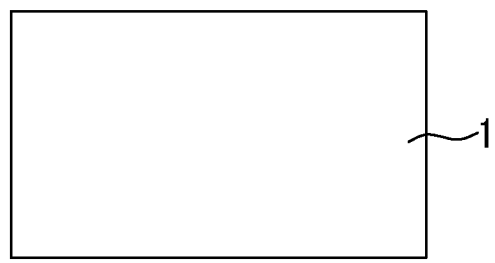
Figure 2B:
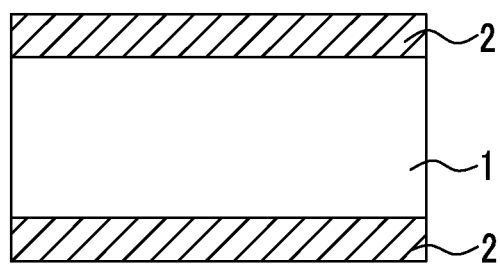
Figure 2C:
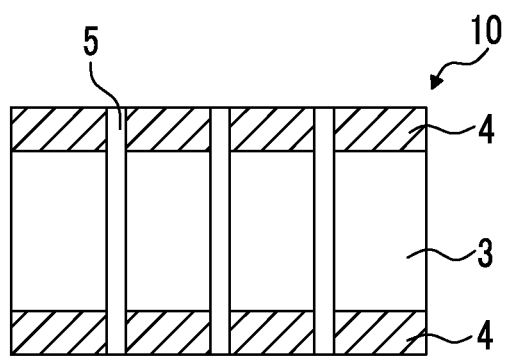

Here, the aluminum plate 10 illustrated in FIG. 3A is an aspect in which first metal layers 6 and second metal layers 7 which are made of metals other than aluminum (for example, zinc, copper, nickel, and the like) or alloys are provided on the inner walls of the through holes 5 and can be produced by carrying out, for example, a substitution treatment and a plating treatment, which will be described below, on the inner walls of the through holes in the aluminum substrate illustrated in FIG. 2C.

Figure 1D:
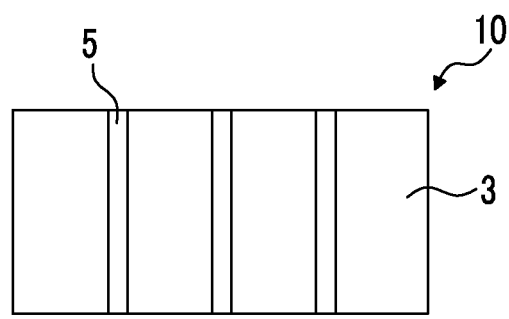
Figure 1E:
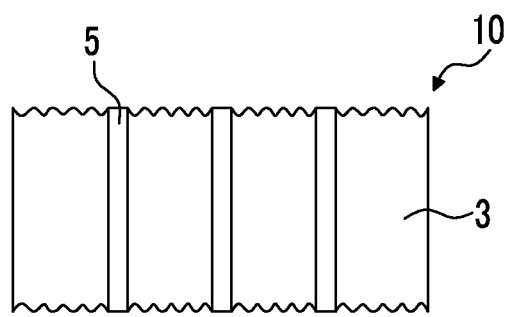
Figure 2D:
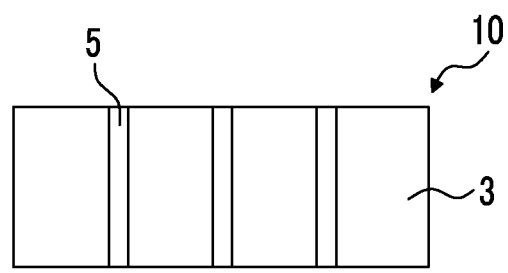
Figure 2E:
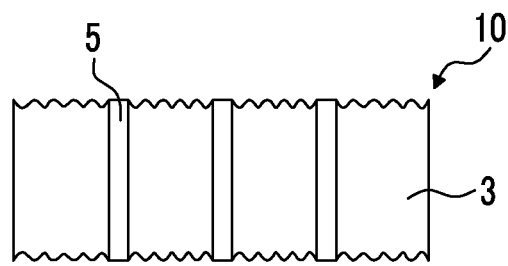

In addition, the aluminum plate 10 illustrated in FIG. 3B is an aspect in which first metal layers 6 and second metal layers 7 which are made of metals other than aluminum or alloys are provided on the front surface and the rear surface of the aluminum substrate 3 having the through holes and the inner walls of the through holes and can be produced by carrying out, for example, a substitution treatment and a plating treatment, which will be described below, on the aluminum substrate illustrated in FIG. 1D or 2D.

<Substitution Treatment>

The substitution treatment is a treatment in which part or all of the surfaces of the aluminum substrate including at least the inner walls of the through holes are immersion-plated with zinc or a zinc alloy.

Examples of an immersion plating liquid include a solution mixture of 120 g/L of sodium hydroxide, 20 g/L of zinc oxide, 2 g/L of crystalline ferric chloride, 50 g/L of potassium sodium tartrate, and 1 g/L of sodium nitrate, and the like.

In addition, commercially available Zn or Zn alloy plating liquid may be used, and, for example, SUB STAR Zn-1, Zn-2, Zn-3, Zn-8, Zn-10, Zn-111, Zn-222, Zn-291, and the like, all manufactured by Okuno Chemical Industries Co., Ltd., can be used.

The immersion duration of the aluminum substrate in the above-described immersion plating liquid is preferably in a range of 15 seconds to 40 seconds, and the immersion temperature is preferably in a range of 15° C. to 40° C.

<Plating Treatment>

In a case in which a zinc coating is formed by immersion-plating the surfaces of the aluminum substrate with zinc or an zinc alloy by means of the above-described substitution treatment, it is preferable to carry out, for example, a plating treatment in which the zinc coating is substituted with nickel by means of electroless plating described below and then a variety of metals are precipitated by means of electrolytic plating described blow.

(Electroless Plating Treatment)

As a nickel plating liquid that is used in an electroless plating treatment, it is possible to use a broad range of commercially available products, and examples thereof include an aqueous solution including 30 g/L of nickel sulfate, 20 g/L of sodium phosphinate, and 50 g/L of ammonium citrate, and the like.

In addition, examples of a nickel alloy plating liquid include Ni—P alloy plating liquids in which a phosphorus compound serves as a reducing agent, Ni—B plating liquids in which a boron compound serves as a reducing agent, and the like.

The immersion duration in the above-described nickel plating liquid or nickel alloy plating liquid is preferably in a range of 15 seconds to 10 minutes, and the immersion temperature is preferably in a range of 30° C. to 90° C.

(Electrolytic Plating Treatment)

In a case in which, for example, electroplating of Cu is carried out as an electrolytic plating treatment, a plating liquid is, for example, a plating liquid obtained by adding 60 g/L to 110 g/L of copper sulfate, 160 g/L to 200 g/L of sulfuric acid, and 0.1 mL/L to 0.15 mL/L of hydrochloric acid to pure water and further adding 1.5 mL/L to 5.0 mL/L of TOP LUCINA SF base WR, 0.5 mL/L to 2.0 mL/L of TOP LUCINA SF-B, and 3.0 mL/L to 10 mL/L of TOP LUCINA SF leveller, all manufactured by Okuno Chemical Industries Co., Ltd., thereto as additives.

The immersion duration in the above-described copper plating liquid is not particularly limited since the immersion duration is dependent on the thickness of a Cu film, and, in a case in which, for example, a 2 μm-thick Cu film is formed, the aluminum substrate is preferably immersed in the plating liquid for approximately five minutes at a current density of 2 A/dm$^2$, and the immersion temperature is preferably in a range of 20° C. to 30° C.

[Boehmite Treatment]

In the manufacturing method of the present invention, it is preferable to carry out a boehmite treatment after the above-described through hole-forming step or after the oxidized film is formed by further carrying out anodization after the above-described oxidized film-removing step since it is possible to adjust the average opening diameter of the through holes formed by means of the above-described electrolytic dissolution treatment to be small in a range of approximately 0.1 μm to 20 μm.

Here, in the boehmite treatment, a reaction in which aluminum reacts with high-temperature water or superheated steam so as to generate a pseudoboehmite hydrated oxide coating is used, and it is possible to generate a hydrated oxide coating by, for example, adjusting the pH of water (for example, pure water or deionized water) (100° C. to 400° C.) to be 7 to 12 and immersing the aluminum substrate therein.

[Water Washing Treatment]

In the present invention, it is preferable to carry out water washing after the completion of the steps of the respective treatments described above. In the water washing, it is possible to use pure water, well water, tap water, or the like. In order to prevent the treatment liquids from being carried to the subsequent steps, a nipping device may be used.

[Aluminum Plate]

An aluminum plate of the present invention is an aluminum plate having an aluminum substrate having a plurality of through holes in a thickness direction, in which the average opening diameter of the through holes is in a range of 0.1 μm to 100 μm, and the proportion of through holes having an opening diameter of 5 μm or smaller in the through holes is 50% or lower.

Here, the average opening diameter of the through holes is obtained by capturing the surface of the aluminum plate from directly above at a magnification of 100 times to 10,000 times using a high-resolution Scanning Electron Microscope (SEM), extracting at least 20 through holes having a circumference connected in a cylindrical shape in the obtained SEM photograph, obtaining opening diameters by scanning the diameters thereof, and computing the average value thereof.

Meanwhile, regarding the magnification, it is possible to appropriately select a magnification in the above-described range so as to obtain a SEM photograph from which 20 or more through holes can be extracted. In addition, in order to obtain the opening diameter, the maximum value of the distance between the end portions of the through hole portions was measured. That is, the shape of the opening portion of the through hole is not limited to a substantially circular shape, and thus, in a case in which the shape of the opening portion is a non-circular shape, the maximum value of the distance between the end portions of the through hole portions is used as the opening diameter. Therefore, for example, even in the case of a through hole having a shape that looks like two or more through holes integrated together, the through hole is considered as a single through hole, and the maximum value of the distance between the end portions of the through hole portions is used as the opening diameter.

In addition, the proportion of through holes having an opening diameter of 5 μm or smaller is obtained by capturing a SEM photograph using the same method as in the above-described measurement of the average opening diameter of the through holes, measuring the opening diameters of all through holes at five places in a 30 mm×30 mm view in a 10 cm×10 cm range of the obtained SEM photograph, and computing the proportion of the number of through holes having an opening diameter of 5 μm or smaller in the number of all of the measured through holes.

In the present invention, since the average opening diameter of the through holes is in a range of 0.1 μm to 100 μm, and the proportion of through holes having an opening diameter of 5 μm or smaller in the through holes is 50% or lower, it is possible to use the aluminum plate in collectors having excellent adhesiveness to active material layers.

This is considered to be because, as described above, it becomes easy for active materials, binders, conductive assistants, and undercoats to link together through through holes in collectors.

Next, the constitution of the aluminum plate of the present invention will be described in detail.

The aluminum plate of the present invention can be easily obtained using the above-described manufacturing method of the present invention, and thus examples of the overall constitution include the same constitution as the aluminum plates 10 illustrated in FIGS. 1C to 1E, FIGS. 2C to 2E, and FIGS. 3A and 3B.

Among these constitutions, constitutions having no oxidized films are preferred since, in a case in which the aluminum plate of the present invention is used as a collector for a storage device which will be described below, the resistance value decreases, and the output characteristics become favorable. Specifically, the same constitution as the aluminum plates 10 illustrated in FIGS. 1D and 1E and FIGS. 2D and 2E is preferred.

[Aluminum Substrate]

As long as the aluminum substrate having the aluminum plate of the present invention is an aluminum substrate in which has a plurality of through holes having an average opening diameter in a range of 0.1 μm to 100 μm and the proportion of through holes having an opening diameter of 5 μm or smaller in the through holes is 50% or lower, the material of the aluminum substrate is not particularly limited, and, for example, well-known aluminum substrates such as pure aluminum-based substrates (for example, 1N30 material, 1085 material, and the like), 3000-based substrates (for example, 3003 material and the like), and 8000-based substrates (for example, 8021 material and the like) can be used. Meanwhile, the aluminum substrate may contain elements other than aluminum (for example, Si, Fe, Cu, and the like), and, for example, the aluminum substrate may contain 0.01% by mass to 0.8% by mass of Si, 0.02% by mass to 2.0% by mass of Fe, and 0.3% by mass or less of Cu.

In addition, the thickness of the aluminum substrate is preferably in a range of 5 μm to 1,000 μm, more preferably in a range of 5 μm to 200 μm, still more preferably in a range of 5 μm to 50 μm, and particularly preferably in a range of 8 μm to 30 μm. Meanwhile, the thickness (5 μm to 1,000 μm) of the aluminum substrate regulated in the above-described manufacturing method of the present invention is the thickness of the aluminum substrate which is yet to be subjected to the oxidized film-forming treatment.

In addition, the number of the intermetallic compounds in the aluminum substrate is preferably in a range of 1,000 compounds/mm$^2$ to 1,000,000 compounds/mm$^2$, more preferably in a range of 5,000 compounds/mm$^2$ to 800,000 compounds/mm$^2$, and still more preferably in a range of 10,000 compounds/mm$^2$ to 500,000 compounds/mm$^2$.

In addition, the tensile strength of the aluminum substrate is preferably in a range of 100 N/mm$^2$ to 350 N/mm$^2$ and more preferably in a range of 140 N/mm$^2$ to 280 N/mm$^2$.

In addition, the elongation of the aluminum substrate is preferably in a range of 0.1% to 3.0% and more preferably in a range of 0.2% to 2.0%.

As the above-described aluminum substrate, it is possible to use, for example, aluminum materials having alloy numbers shown in Table 1 below.

TABLE 1

| Alloy No. | Si (% by mass) | Fe (% by mass) | Cu (% by mass) | Tensile strength (N/mm$^2$) | Elongation (%) |
|---|---|---|---|---|---|
| 1085 | 0.02 | 0.04 | <0.01 | 175 | 3.1 |
| 1N30 | 0.11 | 0.45 | 0.02 | 173 | 2.2 |
| 8021 | 0.04 | 1.44 | <0.01 | 161 | 1.3 |
| 3003 | 0.60 | 0.70 | 0.10 | 265 | 2.0 |

<Through Holes>

As described above, the through holes in the aluminum substrate have an average opening diameter in a range of 0.1 μm to 100 μm, and the proportion of through holes having an opening diameter of 5 m or smaller is 50% or lower.

Here, the average opening diameter of the through holes is preferably in a range of 1 μm to 100 μm, more preferably in a range of 5 μm to 50 μm, and still more preferably in a range of 8 μm to 40 μm since adhesiveness to active material layers becomes more favorable.

In addition, the proportion of through holes having an opening diameter of 5 μm or smaller is preferably 40% or lower, more preferably 30% or lower, and still more preferably in a range of 0% to 20% since adhesiveness to active material layers becomes more favorable.

In the present invention, the proportion of through holes having an opening diameter of greater than 30 μm is preferably 20% or higher since adhesiveness to active material layers becomes more favorable and is more preferably in a range of 20% to 60% since, together with adhesiveness, coating properties also become favorable when active material layers are formed.

Here, "the proportion of through holes having an opening diameter of greater than 30 μm" is obtained by capturing a SEM photograph using the same method as in the above-described measurement of the average opening diameter of the through holes, measuring the opening diameters of all through holes at five places in a 30 mm×30 mm view in a 10 cm×10 cm range of the obtained SEM photograph, and computing the proportion of the number of through holes having an opening diameter of greater than 30 μm in the number of all of the measured through holes.

In addition, in the present invention, since the average aperture due to the through holes is preferably in a range of 0.5% to 60% and more preferably in a range of 1% to 50%.

Here, the average aperture of the through holes is obtained as described below. A parallel light optical unit is installed on one surface side of the aluminum substrate, parallel light is transmitted, and the surface of the aluminum substrate is captured using an optical microscope at a magnification of 100 times from the other surface of the aluminum substrate, thereby obtaining a photograph. In 100 mm×75 mm views (at five places) in a 10 cm×10 cm range of the obtained photograph, the proportion (the opening area/the geometric area) is computed from the total opening area of the through holes and the area of the views (the geometric area), and the average values in the respective views (at five places) are computed as the average apertures.

[Recessed Portions]

In the present invention, on the surface of the aluminum substrate (the oxidized film in a case in which an oxidized film described below is provided), that is, the surface of the aluminum plate, unpenetrated holes having an average opening diameter in a range of 0.1 μm to 100 μm, that is, recessed portions are preferably provided at an occupancy of 10% or greater since adhesiveness to active material layers or undercoats becomes more favorable. Meanwhile, these recessed portions can be formed by carrying out an arbitrary roughening treatment in the above-described manufacturing method of the present invention.

Here, the average opening diameter of the recessed portions is obtained by capturing the surface of the aluminum substrate from directly above at a magnification of 200 times to 10,000 times using a high-resolution scanning electron microscope (SEM), extracting at least 20 uneven-structured recessed portions (pits) having a circumference connected in a cylindrical shape in the obtained SEM photograph, and obtaining opening diameters by scanning the diameters thereof. Meanwhile, in order to obtain the opening diameter, the maximum value of the distance between the end portions of the opening portion in the recessed portion was measured. That is, the shape of the opening portion is not limited to a substantially circular shape, and thus, in a case in which the shape of the opening portion is a non-circular shape, the maximum value of the distance between the end portions of the recessed portions is used as the opening diameter. Therefore, for example, even in the case of a recessed portion having a shape that looks like two or more recessed portions integrated together, the recessed portion is considered as a single recessed portion, and the maximum value of the distance between the end portions of the opening portion is used as the opening diameter.

In addition, the occupancy of the recessed portions is obtained by, similar to the average opening diameter of the recessed portions, in 100 mm×75 mm views at five places in a 10 cm×10 cm range of the obtained photograph, computing the proportion [the opening area of the recessed portions/(the geometric area−the opening area of the through holes)] from the sum of the opening areas of the recessed portions having the above-described opening diameter and the area of a surface obtained by subtracting the opening area of the through holes from the area of the views (the geometric area) and computing the average values in the respective views (at five places) as the occupancy.

In addition, the average opening diameter of the recessed portions is preferably in a range of 0.2 μm to 20 μm.

Similarly, the occupancy of the recessed portions is preferably in a range of 30% to 100%.

[Arithmetic Average Roughness Ra]

In the present invention, the arithmetic average roughness Ra of the surface of the aluminum substrate (the oxidized film in a case in which an oxidized film described below is provided), that is, the surface of the aluminum plate is preferably 0.2 μm or greater and more preferably in a range of 0.2 μm to 1.5 μm.

When the arithmetic average roughness Ra is 0.2 μm or greater, adhesiveness to active material layers further improves, and an increase in the surface area leads to an increase in the contact area, and thus the capacity maintenance rate, and output characteristics of storage devices (particularly, lithium ion secondary batteries, lithium ion capacitors, and the like) in which aluminum plates (collectors) obtained using the manufacturing method of the present invention are used enhance.

Here, the arithmetic average roughness Ra refers to the average value of arithmetic average roughness values measured at five places in a 400 μm×400 μm measurement range using a non-contact-type surface roughness meter (for example, a three-dimensional non-contact-type surface shape system Micromap or the like).

[Specific Surface Area ΔS]

In the present invention, the specific surface area ΔS of the surface of the aluminum substrate (the oxidized film in a case in which an oxidized film described below is provided), that is, the surface of the aluminum plate is preferably 5% or greater and more preferably in a range of 10% to 80%.

When the specific surface area ΔS is 5% or greater, the contact area with active material layers or undercoats increases, and thus adhesiveness becomes more favorable, and it is possible to produce storage devices having favorable output characteristics, cycle characteristics, rate characteristics, and the like.

Here, the specific surface area ΔS refers to a value obtained from Expression (i) below using the actual area $S_x$ that is obtained from three-dimensional data, which is obtained by measuring specific surface areas using an atomic force microscope at 512×128 points in a 25 μm×25 μm range on the surface, using a three-point approximation method and a geometric measurement area $S_0$.

$$\Delta S = (S_x - S_0)/S_0 \times 100 (\%) \qquad (i)$$

In addition, in the present invention, in order to obtain the specific surface area ΔS, the surface shape is measured using an Atomic Force Microscope (AFM), and three-dimensional data is obtained. The measurement can be carried out, for example, under the following conditions.

That is, the aluminum plate is cut into a 1 cm×1 cm size and is set in a horizontal stage on a piezo scanner, a cantilever is brought close to the specimen surface, scanning is carried out in the XY direction when the cantilever reaches a region in which an atomic force acts, and, at this time, the surface shape (wave structure) of the specimen is obtained using a piezo displacement in the Z direction. As the piezo scanner, a scanner capable of performing scanning 150 μm in the XY direction and 10 μm in the Z direction is used. As the cantilever, a cantilever having a resonance frequency in a range of 120 kHz to 150 kHz and a spring constant in a range of 12 N/m to 20 N/m (SI-DF20, manufactured by NANOPROBES, Inc.) is used, and the measurement is carried out in a Dynamic Force Mode (DFM). In addition, the obtained three-dimensional data is least-square-approximated so as to correct the slight inclination of the specimen, thereby obtaining a criterion surface. In the measurement, 512×128 places in a 25 μm×25 μm range on the surface are measured. The resolution in the XY direction is 1.9 μm, the resolution in the Z direction is 1 nm, and the scanning rate is set to 60 μm/sec.

Adjacent three points are extracted using the three-dimensional data (f(x, y)) obtained above, and the sum of the areas of fine triangles formed by the three points is obtained and is used as the actual area $S_x$. The specific surface area $\Delta S$ is obtained using Expression (i) from the obtained actual area $S_x$ and geometric measurement area $S_0$.

[Amount of Surface Oxygen Atom-Containing Coating]

Since the aluminum plate of the present invention capable of decreasing the electrode resistance when used in collectors for storage devices, the etching duration necessary for the amount of oxygen atoms, which is measured by means of Electron Spectroscopy for Chemical Analysis (hereinafter, abbreviated as "ESCA") after Ar ion etching is carried out on the surface of the aluminum plate using a device and a method described below, to reach 0% is preferably 12 minutes or shorter and more preferably 9 minutes or shorter.

<Device>

PHI Quantera SXM+AR ion gun manufactured by (ULVAC-PHI, Incorporated)

<Method>

Etching region: 2 mm$^2$, etching intensity: 1 kV, the diameter of an X-ray beam: 40 μm Intensity of X-ray (power: 4.5 W, accelerated voltage: 15 kV)

Data: The etching duration necessary for the fragments of oxygen atom to reach zero

[Oxidized Film]

Examples of oxidized films that the aluminum plate of the present invention may have include oxidized films having through holes which are formed after the oxidized film-forming step and the through hole-forming step in the above-described manufacturing method of the present invention.

The aluminum plate of the present invention is preferably an aspect in which no oxidized films having through holes are provided and is preferably, for example, an aluminum plate after the oxidized film-removing step in the above-described manufacturing method of the present invention.

The thickness of the aluminum plate of the present invention is preferably in a range of 5 μm to 100 μm, more preferably in a range of 5 μm to 50 μm, and still more preferably in a range of 8 μm to 30 μm.

[Collector for Storage Device]

A collector for a storage device of the present invention (hereinafter, also abbreviated as "the collector of the present invention") is a collector for a storage device constituted of an aluminum plate which is obtained using the above-described manufacturing method of the present invention or the above-described aluminum plate of the present invention.

In the collector of the present invention, the aluminum plate has a plurality of through holes in the thickness direction, and thus, for example, in a case in which the collector is used in lithium ion capacitors, pre-doping of lithium within a short period of time becomes possible, and it becomes possible to more uniformly disperse lithium. In addition, adhesiveness to active material layers or active charcoal becomes favorable, and it is possible to produce storage devices that are excellent in terms of productivity such as cycle characteristics, output characteristics, coating aptitude, and the like.

Particularly, in the collector of the present invention, when the average opening diameter of the through holes in the aluminum plate is in a range of 8 μm to 30 μm, adhesiveness to active material layers becomes more favorable, and it is possible to produce storage devices having improved cycle characteristics.

[Storage Device]

A storage device of the present invention is a storage device having a positive electrode, a negative electrode, and an electrolytic solution (electrolyte), in which the collector of the present invention is used in at least one of the positive electrode or the negative electrode.

Here, regarding the specific constitutions or applications of the storage device (particularly, secondary battery), it is possible to appropriately employ materials or applications described in Paragraphs "0090" to "0123" of JP2012-216513A, the content of which is incorporated into the present specification by reference.

<Positive Electrode>

The positive electrode in which the collector of the present invention is used is a positive electrode having a positive electrode collector in which the collector of the present invention is used for a positive electrode and a layer including a positive electrode active material that is formed on the surface of the positive electrode collector (positive electrode active material layer).

Here, regarding the positive electrode active material, conductive assistants, binders, solvents, and the like which the positive electrode active material layer may include, it is possible to appropriately employ materials described in Paragraphs "0077" to "0088" of JP2012-216513A, the content of which is incorporated into the present specification by reference.

<Negative Electrode>

The negative electrode in which the collector of the present invention is used is a negative electrode having a negative electrode collector in which the collector of the present invention is used for a negative electrode and a layer including a negative electrode active material that is formed on the surface of the negative electrode collector.

Here, regarding the negative electrode active material, it is possible to appropriately employ materials described in Paragraph "0089" of JP2012-216513A, the content of which is incorporated into the present specification by reference.

EXAMPLES

Hereinafter, the present invention will be described in more detail on the basis of examples. Materials, amounts used, fractions, treatment contents, treatment orders, and the like described in the following examples can be appropriately modified within the scope of the gist of the present invention. Therefore, the scope of the present invention should not be interpreted in a limited manner by the examples described below.

Example 1

<Production of Aluminum Substrate for Collector>

A treatment which will be described below was carried out on the surface of an aluminum substrate having a thickness of 5 m and a width of 200 mm (JIS H-4160, alloy number: 1N30-H, aluminum purity: 99.30%), thereby producing an aluminum substrate for a collector.

(a1) Oxidized Film-Forming Treatment (Oxidized Film-Forming Step)

Direct-current voltage of 15 V was applied to the aluminum substrate for 16 seconds at a direct current density of 25 A/dm$^2$ under a condition of 52° C. using a solution having an aluminum concentration of 5% or lower and the aluminum substrate as an anode at a sulfuric acid concentration of 170 g/L, thereby forming an oxidized film (the amount of the coating: 2.4 g/m$^2$) on a single-side surface (single surface) of the aluminum substrate. After that, water washing was carried out by means of spraying.

(b1) Electrolytic Dissolution Treatment (Through Hole-Forming Step)

Next, an electrolytic treatment was carried out under a condition of the sum of the quantities of electricity being 1,000 C/dm$^2$ using an electrolytic solution (nitric acid concentration: 1%, aluminum concentration: 4.5 g/L) which was held at 50° C. and the aluminum substrate as an anode, thereby forming through holes in the aluminum substrate and the oxidized film. Meanwhile, the electrolytic treatment was carried out using a direct-current power source. The current density was set to 25 A/dm$^2$.

After that, the aluminum substrate and the oxidized film were washed with water by means of spraying and were dried, thereby producing an aluminum plate having an aluminum substrate having through holes.

(c1) Removal Treatment of Oxidized Films (Oxidized Film-Removing Step)

Next, the aluminum substrate that had been subjected to the electrolytic dissolution treatment was immersed in an aqueous solution (liquid temperature: 35° C.) having a caustic soda concentration of 5% by mass and an aluminum ion concentration of 0.5% by mass for three seconds, thereby dissolving and removing the oxidized film. Meanwhile, in Table 2 below, the removal treatment of oxidized films under this condition is denoted as "alkali".

After that, the aluminum substrate was washed with water by means of spraying and was dried, thereby producing an aluminum plate having through holes.

Examples 2 to 14

Aluminum plates were produced using the same method as in Example 1 except for the fact that the thicknesses (t) of the aluminum substrates and the quantities of electricity (Q) in the electrolytic dissolution treatment were changed to values shown in Table 2 below, and, in Example 5, an electrolytic roughening treatment described in (d1) below was carried out after the removal treatment of oxidized films described in (c1).

(d1) Electrolytic Roughening Treatment

Figure 4:
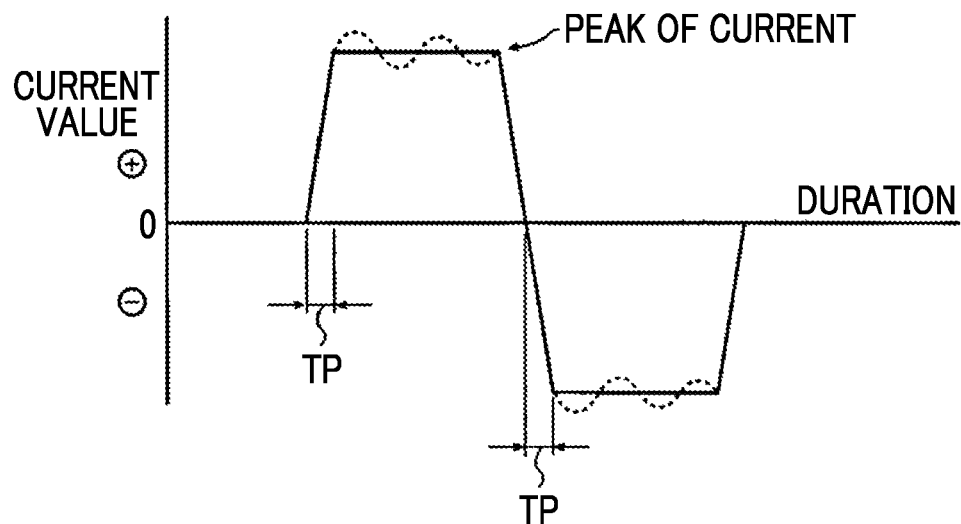
FIG. 4 is a graph illustrating an example of an alternating waveform current waveform diagram that is used in an arbitrary electrochemical roughening treatment in the method for manufacturing an aluminum plate of the present invention.
Figure 5:
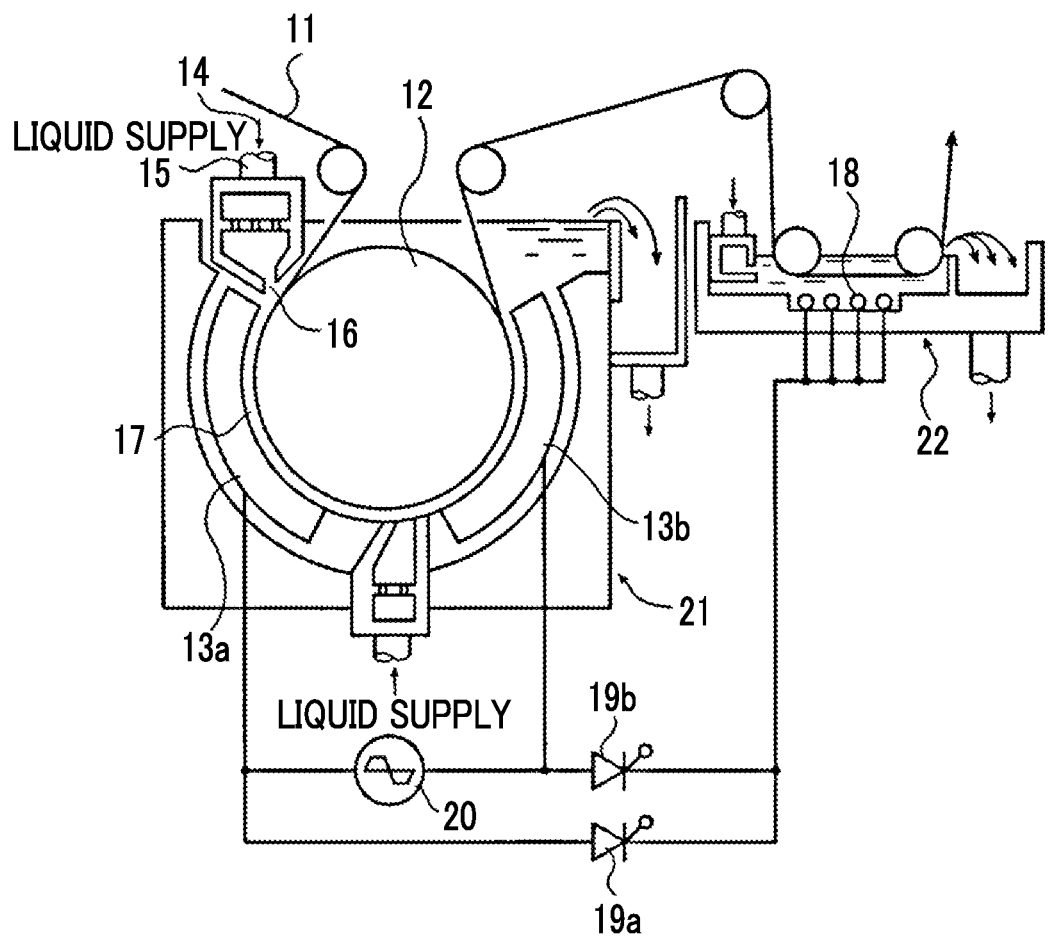
FIG. 5 is a schematic view illustrating an example of a radial cell in the electrochemical roughening treatment in which an alternating current is used.

Next, an electrochemical roughening treatment was continuously carried out on the aluminum substrate that had been subjected to the removal treatment of oxidized films using 60 Hz alternating-current voltage. At this time, the electrolytic solution was an aqueous solution of 10 g/L of nitric acid (including 4.5 g/L of aluminum ions), and the temperature was 50° C. The alternating-current power source waveform was the waveform illustrated in FIG. 4, and the electrochemical roughening treatment was carried out using trapezoidal square wave alternating current in which the time TP taken for the current value to reach the peak from zero was 0.8 msec and the duty ratio was 1:1 and a carbon electrode as a counter electrode. Ferrite was used as an auxiliary anode. As an electrolysis tank used, the tank illustrated in FIG. 5 was used. Regarding the current density, the peak value of the current was 50 A/dm$^2$, and the average value was 22.6 A/dm$^2$. In addition, regarding the quantity of electricity, the sum of the quantities of electricity was 250 C/dm$^2$ when an aluminum foil was used as an anode. After that, the aluminum substrate was washed with water by means of spraying.

Example 15

An aluminum plate was produced using the same method as in Example 1 except for the fact that a removal treatment of oxidized films described in (c2) below was carried out instead of the removal treatment of oxidized films described in (c1).

(c2) Removal Treatment of Oxidized Films (Oxidized Film-Removing Step)

Next, the aluminum substrate that had been subjected to the electrolytic dissolution treatment was immersed in a sulfuric acid aqueous solution (sulfuric acid concentration: 300 g/L, liquid temperature: 60° C.) for 120 seconds, thereby dissolving and removing the oxidized film.

After that, the aluminum substrate was washed with water by means of spraying and was dried, thereby producing an aluminum plate having through holes. Meanwhile, in Table 2 below, the removal treatment of oxidized films under this condition is denoted as "acid".

Example 16

An aluminum plate was produced under the same conditions as in Example 6 except for the fact that the removal treatment of oxidized films described in (c1) was not carried out.

Example 17

An aluminum plate was produced using the same method as in Example 6 except for the fact that an oxidized film-forming treatment (oxidized film-forming treatment) described in (a2) below was carried out instead of the oxidized film-forming treatment described in (a1).

(a2) Oxidized Film-Forming Treatment (Oxidized Film-Forming Step)

Direct-current voltage of 15 V was applied to the aluminum substrate for 16 seconds at a direct current density of 25 A/dm$^2$ under a condition of 52° C. using a solution having an aluminum concentration of 5% or lower and the aluminum substrate as an anode at a sulfuric acid concentration of 170 g/L, thereby forming an oxidized film (the amount of the coating: 2.4 g/m$^2$) on a single surface of the aluminum substrate, and then direct-current voltage of 15 V was applied to the aluminum substrate for four seconds at a direct current density of 25 A/dm$^2$ under a condition of 52° C. using a solution having an aluminum concentration of 5% or lower and the aluminum substrate as an anode at a sulfuric acid concentration of 170 g/L, thereby further forming an oxidized film (the amount of the coating: 0.6 g/m$^2$) on the other surface thereof. After that, water washing was carried out by means of spraying.

Comparative Examples 1 to 7

Aluminum plates were produced using the same method as in Example 1 except for the fact that the thicknesses of the aluminum plates and the presence and absence of the respective steps were changed as shown in Table 2 below.

For the respective produced aluminum plates, the thicknesses of the aluminum substrates used, that is, the total thicknesses (t) of the oxidized films and the aluminum substrates when the electrochemical dissolution treatment was carried out, the presence and absence of the respective steps, the quantities of electricity (Q) in the electrolytic dissolution treatments, "Q/t" in Expression (I), whether or not through holes were formed, the average opening diameters, and the average apertures are shown in Table 2.

Figure 6:
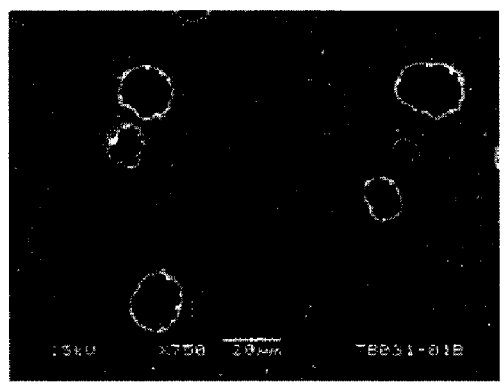
FIG. 6 is a scanning electron microscope (SEM) image of a surface of a collector for a storage device produced in Example 4 which is captured at a magnification of 750 times using a high-resolution scanning electron microscope (SEM).
Figure 7:
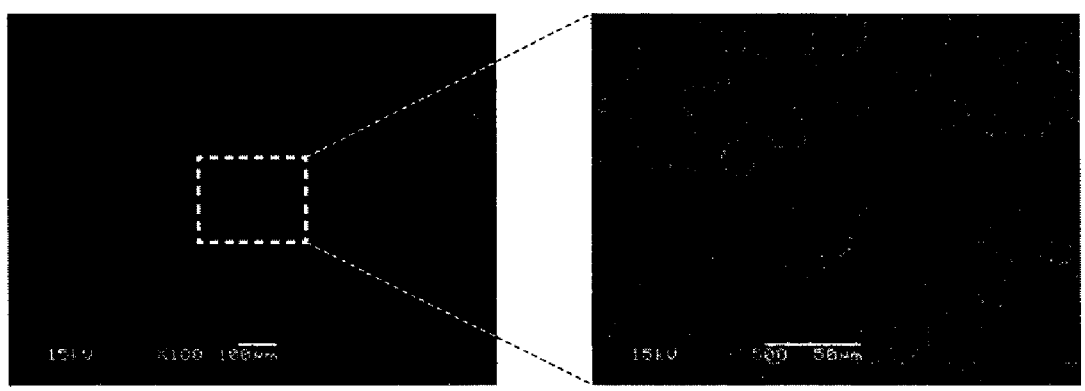
FIG. 7 illustrates a SEM image of a surface of a collector for a storage device produced in Example 5 which is captured at a magnification of 100 times using a high-resolution scanning electron microscope (SEM) and a SEM image captured by enlarging a part of the above-described SEM image five times (at a magnification of 500 times).
Figure 8:
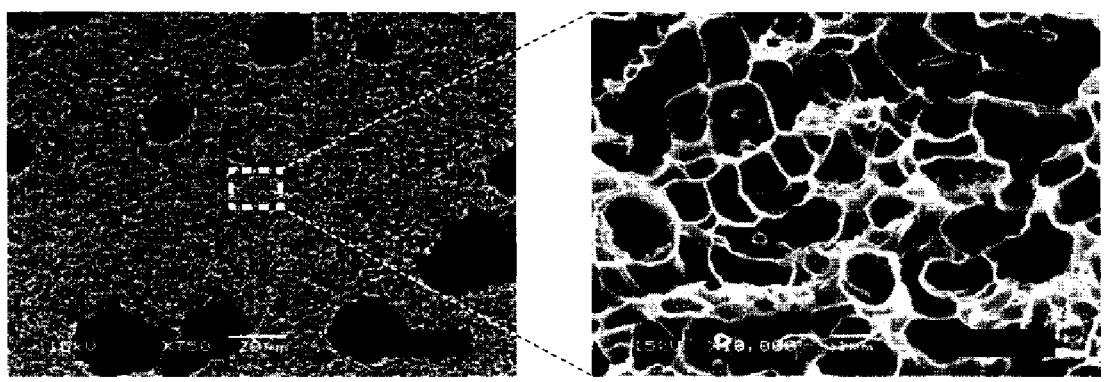
FIG. 8 illustrates a SEM image of the surface of the collector for a storage device produced in Example 5 which is captured at a magnification of 750 times using a high-resolution scanning electron microscope (SEM) and a SEM image captured by enlarging a part of the above-described SEM image 13 times (at a magnification of 10,000 times).

In addition, a SEM image of the surface of the aluminum plate produced in Example 4, which was captured using a high-resolution scanning electron microscope (SEM) at a magnification of 750 times is illustrated in FIG. 6, a SEM image of the surface of the aluminum substrate produced in Example 5, which was captured using SEM at a magnification of 100 times and a SEM image of a part thereof captured (at a magnification of 500 times) after enlarging the part five times are illustrated in FIG. 7, and a SEM image of the surface of the aluminum substrate produced in Example 5, which was captured using SEM at a magnification of 750 times and a SEM image of a part thereof captured (at a magnification of 10,000 times) after enlarging the part 13 times are illustrated in FIG. 8.

TABLE 2

| | Thickness of aluminum substrate (μm) | Oxidized film-forming treatment | | Electrolytic dissolution treatment | | | Oxidized film-removing treatment | |
|---|---|---|---|---|---|---|---|---|
| | | Present or absent | Treated surface | Present or absent | Quantity of electricity Q (C/dm$^2$) | Q/t | Present or absent | condition |
| Example 1 | 5 | Present | Single surface | Present | 1000 | 200 | Present | Alkali |
| Example 2 | 15 | Present | Single surface | Present | 1000 | 67 | Present | Alkali |
| Example 3 | 20 | Present | Single surface | Present | 200 | 10 | Present | Alkali |
| Example 4 | 20 | Present | Single surface | Present | 500 | 25 | Present | Alkali |
| Example 5 | 20 | Present | Single surface | Present | 1000 | 50 | Present | Alkali |
| Example 6 | 20 | Present | Single surface | Present | 1000 | 50 | Present | Alkali |
| Example 7 | 20 | Present | Single surface | Present | 3000 | 150 | Present | Alkali |
| Example 8 | 20 | Present | Single surface | Present | 6000 | 300 | Present | Alkali |
| Example 9 | 30 | Present | Single surface | Present | 1000 | 33 | Present | Alkali |
| Example 10 | 100 | Present | Single surface | Present | 2000 | 20 | Present | Alkali |
| Example 11 | 500 | Present | Single surface | Present | 3000 | 6 | Present | Alkali |
| Example 12 | 1000 | Present | Single surface | Present | 5000 | 5 | Present | Alkali |
| Example 13 | 20 | Present | Single surface | Present | 80 | 4 | Present | Alkali |
| Example 14 | 20 | Present | Single surface | Present | 8000 | 400 | Present | Alkali |
| Example 15 | 20 | Present | Single surface | Present | 1000 | 50 | Present | Acid |
| Example 16 | 20 | Present | Single surface | Present | 1000 | 50 | Absent | — |
| Example 17 | 20 | Present | Both surfaces | Present | 1000 | 50 | Present | Alkali |
| Comparative Example 1 | 20 | Present | Single surface | Absent | — | — | Absent | — |
| Comparative Example 2 | 20 | Absent | No | Present | 1000 | 50 | Absent | — |
| Comparative Example 3 | 20 | Absent | No | Absent | — | — | Present | Alkali |
| Comparative Example 4 | 20 | Absent | No | Present | 1000 | 50 | Present | Alkali |
| Comparative Example 5 | 20 | Present | Single surface | Absent | — | — | Present | Alkali |
| Comparative Example 6 | 3 | Present | Single surface | Present | 1000 | 333 | Absent | — |
| Comparative Example 7 | 1100 | Present | Single surface | Present | 1000 | 1 | Absent | — |

| | Electrolytic roughening treatment | Through hole | | |
|---|---|---|---|---|
| | | Formed or not | Average opening diameter (μm) | Average aperture (%) |
| Example 1 | No | Formed | 43 | 22 |
| Example 2 | No | Formed | 27 | 18 |
| Example 3 | No | Formed | 8 | 7 |
| Example 4 | No | Formed | 13 | 9 |
| Example 5 | Yes | Formed | 18 | 15 |

TABLE 2-continued

| | | | | |
|---|---|---|---|---|
| Example 6 | No | Formed | 18 | 15 |
| Example 7 | No | Formed | 29 | 28 |
| Example 8 | No | Formed | 72 | 49 |
| Example 9 | No | Formed | 13 | 12 |
| Example 10 | No | Formed | 10 | 8 |
| Example 11 | No | Formed | 7 | 4 |
| Example 12 | No | Formed | 6 | 2 |
| Example 13 | No | Formed | 1 | 0.5 |
| Example 14 | No | Formed | 90 | 58 |
| Example 15 | No | Formed | 18 | 15 |
| Example 16 | No | Formed | 18 | 15 |
| Example 17 | No | Formed | 19 | 15 |
| Comparative Example 1 | No | Not formed | — | — |
| Comparative Example 2 | No | Not formed | — | — |
| Comparative Example 3 | No | Not formed | — | — |
| Comparative Example 4 | No | Not formed | — | — |
| Comparative Example 5 | No | Not formed | — | — |
| Comparative Example 6 | No | Not formed | — | — |
| Comparative Example 7 | No | Not formed | — | — |

As shown in Table 2, it was found from the comparison between the examples and the comparative examples that, when the oxidized film-forming treatment and the electrolytic dissolution treatment are carried out on the surface of an aluminum substrate having a thickness in a range of 5 μm to 1,000 μm, it is possible to easily produce an aluminum plate having through holes having an average opening diameter in a range of approximately 1 μm to 100 μm (Examples 1 to 17).

In addition, it was found from the comparison between Examples 3 to 8 and Example 13 that, when the ratio (Q/t) of the quantity of electricity Q in the electrolytic dissolution treatment to the thickness t of the aluminum substrate is in a range of 5 to 300 (particularly 10 to 300), it is possible to set the average opening diameter of through holes to 5 μm or greater and also adjust the aperture to 5% or greater.

In addition, it was found from the comparison between Examples 5 and 6 and Example 16 that the shapes of formed through holes do not change due to the presence or absence of the oxidized film-removing treatment or the electrolytic roughening treatment, and aluminum plates produced using the manufacturing method of the present invention can be developed in a variety of applications in addition to storage device applications.

Example 18

An aluminum plate was produced using the same method as in Example 6 except for the fact that the temperature condition in the electrolytic dissolution treatment described in (b1) was changed to 40° C. and the quantity of electricity was changed to the value shown in Table 3 below.

Examples 19 to 25

Aluminum plates were produced using the same method as in Example 18 except for the fact that the quantities of electricity in the electrolytic dissolution treatment described in (b1) were changed to the value shown in Table 3 below.

Example 26

An aluminum plate was produced using the same method as in Example 5 except for the fact that the temperature in the electrolytic roughening treatment described in (d1) was changed to 40° C.

Example 27

An aluminum plate was produced using the same method as in Example 5 except for the fact that the temperature in the electrolytic roughening treatment described in (d1) was changed to 40° C. and the sum of the quantities of electricity was changed to 270 C/dm$^2$.

Example 28

An aluminum plate was produced using the same method as in Example 5 except for the fact that the temperature in the electrolytic roughening treatment described in (d1) was changed to 40° C. and the sum of the quantities of electricity was changed to 290 C/dm$^2$.

Example 29

An aluminum plate was produced using the same method as in Example 5 except for the fact that the temperature in the electrolytic roughening treatment described in (d1) was changed to 40° C. and the sum of the quantities of electricity was changed to 350 C/dm$^2$.

Comparative Example 8

An aluminum plate was produced according to a method described in WO2008/078777A.

Specifically, a pattern was formed on the surface of a hard aluminum foil (the thickness: 20 μm) by means of resist printing, and a chemical etching treatment was carried out using an alkali treatment liquid, thereby producing an aluminum plate having through holes having an average opening diameter of 110 μm.

Comparative Example 9

An aluminum plate was produced according to a method described in WO2008/078777A.

Specifically, through holes (the average opening diameter: 300 μm) were mechanically formed in a hard aluminum foil (the thickness: 20 μm) using a punching die, thereby producing an aluminum plate.

Comparative Examples 10 to 12

Aluminum plates were produced according to a method described in WO2008/078777A.

Specifically, the temperatures of hydrochloric acid electrolytic solutions and the quantities of electricity of electrolytic treatments were adjusted with respect to aluminum foils (the thickness: 20 μm) having uniform crystal alignments, thereby producing aluminum plates having through holes having average opening diameters shown in Table 3 below.

For the respective produced aluminum plates, the thicknesses of the aluminum substrates used, that is, the total thicknesses (t) of the oxidized films and the aluminum substrates when the electrochemical dissolution treatment was carried out, the presence and absence of the respective steps, the quantities of electricity (Q) in the electrolytic dissolution treatments, "Q/t" in Expression (I), whether or not through holes were formed, the average opening diameters, the proportions of through holes having an opening diameter of 5 μm or smaller, the proportions of through holes having an opening diameter in a range of greater than 5 μm and 30 μm or smaller, the proportions of through holes having an opening diameter of greater than 30 μm, the average opening diameters, densities, and occupancies of the recessed portions, the arithmetic average roughness values of the surfaces, and the specific surface areas ΔS are shown in Table 3. Meanwhile, in Comparative Examples 8 to 12, the manufacturing methods were different, and thus the conditions for the oxidized film-forming treatments and the like are not shown in Table 3 below.

In addition, for the respective produced aluminum plates, coating properties and adhesiveness were evaluated using methods described below. The results are shown in Table 3 below.

[Evaluation]

<Coating Properties>

Active material layers were formed on both surfaces of the respective produced aluminum plates, and the coating properties were evaluated on the basis of the presence or absence of unevenness on the surfaces of the active material layers. The results are shown in Table 2 below.

First, a slurry was prepared by adding and dispersing active charcoal powder (100 parts by mass) having a specific surface area of 1,950 $m^2$/g as an active material, acetylene black (10 parts by mass), an acrylic binder (7 parts by mass), and carboxymethyl cellulose (4 parts by mass) to and in water.

Next, the prepared slurry was applied onto both surfaces of an aluminum plate in which through holes were formed using a die coater so as to obtain a total thickness of 150 μm, thereby forming an active material layer on the surface of the aluminum plate.

Whether or not unevenness was seen on the surface of the formed active material layer was visually evaluated, and a case in which unevenness having a diameter of 40 μm or greater was invisible was evaluated to be A, a case in which unevenness having a diameter in a range of 40 μm to 100 μm was visible was evaluated to be B, and a case in which unevenness having a diameter of greater than 100 μm was visible was evaluated to be C.

<Adhesiveness>

Adhesiveness was evaluated by measuring the adhesion strength using a peeling test method.

Specifically, an electrode material to which active charcoal was applied was cut into a width of 20 mm and was attached to an aluminum plate, a part of the aluminum plate was fixed to one clamp of the tensile strength tester, tape (cellophane tape manufactured by 3M) was attached to the surface of the electrode material, the aluminum plate was fixed to the other clamp in a state of the front end of the tape being folded 180 degrees, and a 180-degree peeling test was carried out, thereby measuring the adhesion strength between the electrode material and the aluminum plate.

Adhesiveness was evaluated by visually observing the tape surface and the aluminum plate surface after peeling. Specifically, an aluminum plate in which the area percentage of an electrode material residue on the aluminum plate surface was 1% or lower and the area percentage of an electrode material residue on the tape surface was 1% or lower was evaluated to be "AAA", an aluminum plate in which the area percentage of an electrode material residue on the aluminum plate surface was 1% or lower and the area percentage of an electrode material residue on the tape surface was in a range of more than 1% and 5% or lower was evaluated to be "AA", an aluminum plate in which the area percentage of an electrode material residue on the aluminum plate surface was 1% or lower and the area percentage of an electrode material residue on the tape surface was in a range of greater than 5% and 10% or lower was evaluated to be "A", an aluminum plate in which the area percentage of an electrode material residue on the aluminum plate surface was in a range of greater than 1% and 5% or lower and the area percentage of an electrode material residue on the tape surface was greater than 10% was evaluated to be "B", an aluminum plate in which the area percentage of an electrode material residue on the aluminum plate surface was in a range of greater than 5% and 50% or lower and the area percentage of an electrode material residue on the tape surface was greater than 10% was evaluated to be "C", an aluminum plate in which the area percentage of an electrode material residue on the aluminum plate surface was in a range of greater than 50% and 90% or lower and the area percentage of an electrode material residue on the tape surface was greater than 10% was evaluated to be "D", and an aluminum plate in which the area percentage of an electrode material residue on the aluminum plate surface was greater than 90% and the area percentage of an electrode material residue on the tape surface was greater than 10% was evaluated to be "E".

TABLE 3

| | Thickness of aluminum substrate (μm) | Oxidized film-forming treatment | | Electrolytic dissolution treatment | | | Oxidized film-removing treatment | | Through hole electrolytic roughening treatment | Through hole Formed or not | Average opening diameter (μm) |
|---|---|---|---|---|---|---|---|---|---|---|---|
| | | Present or absent | Treated surface | Present or absent | Quantity of electricity Q (C/dm²) | Q/t | Present or absent | condition | | | |
| Example 18 | 20 | Present | Single surface | Present | 1200 | 60 | Present | Alkali | No | Formed | 21 |
| Example 19 | 20 | Present | Single surface | Present | 4000 | 200 | Present | Alkali | No | Formed | 95 |
| Example 20 | 20 | Present | Single surface | Present | 3000 | 150 | Present | Alkali | No | Formed | 73 |
| Example 21 | 20 | Present | Single surface | Present | 700 | 35 | Present | Alkali | No | Formed | 12 |
| Example 22 | 20 | Present | Single surface | Present | 500 | 25 | Present | Alkali | No | Formed | 6 |
| Example 23 | 20 | Present | Single surface | Present | 1500 | 75 | Present | Alkali | No | Formed | 27 |
| Example 24 | 20 | Present | Single surface | Present | 800 | 40 | Present | Alkali | No | Formed | 18 |
| Example 25 | 20 | Present | Single surface | Present | 2000 | 100 | Present | Alkali | No | Formed | 35 |
| Example 26 | 20 | Present | Single surface | Present | 1200 | 60 | Present | Alkali | Yes | Formed | 21 |
| Example 27 | 20 | Present | Single surface | Present | 1200 | 60 | Present | Alkali | Yes | Formed | 21 |
| Example 28 | 20 | Present | Single surface | Present | 1200 | 60 | Present | Alkali | Yes | Formed | 21 |
| Example 29 | 20 | Present | Single surface | Present | 1200 | 60 | Present | Alkali | Yes | Formed | 21 |
| Comparative Example 8 | 20 | | | | | | | | | Formed | 110 |
| Comparative Example 9 | 20 | | | | | | | | | Formed | 300 |
| Comparative Example 10 | 20 | | | | | | | | | Formed | 15 |
| Comparative Example 11 | 20 | | | | | | | | | Formed | 7 |
| Comparative Example 12 | 20 | | | | | | | | | Formed | 3 |

| | Through hole | | | Recessed portion | | Arithmetic average roughness Ra (μm) | Specific surface area ΔS (%) | Evaluation | |
|---|---|---|---|---|---|---|---|---|---|
| | Proportion of through holes with opening diameter of 5 μm or smaller (%) | Proportion of through holes with opening diameter of greater than 5 μm and 30 μm or smaller (%) | Proportion of through holes with opening diameter of greater than 30 μm (%) | Average opening diameter (μm) | Occupancy (%) | | | coating properties | Adhesiveness |
| Example 18 | 10 | 65 | 25 | 5.0 | 10 | 0.3 | 10 | A | A |
| Example 19 | 0 | 2 | 98 | 12.0 | 21 | 0.3 | 18 | B | A |
| Example 20 | 3 | 31 | 66 | 11.0 | 18 | 0.3 | 15 | B | A |
| Example 21 | 31 | 58 | 11 | 4.0 | 8 | 0.3 | 6 | A | B |
| Example 22 | 48 | 47 | 5 | 2.0 | 6 | 0.2 | 5 | A | C |
| Example 23 | 8 | 61 | 31 | 10.0 | 12 | 0.2 | 12 | A | A |
| Example 24 | 17 | 64 | 19 | 5.0 | 9 | 0.3 | 8 | A | B |
| Example 25 | 8 | 52 | 40 | 10.0 | 15 | 0.3 | 13 | A | A |
| Example 26 | 10 | 65 | 25 | 0.2 | 10 | 0.3 | 23 | A | AA |
| Example 27 | 10 | 65 | 25 | 1.2 | 50 | 0.4 | 36 | A | AA |
| Example 28 | 10 | 65 | 25 | 1.2 | 100 | 0.5 | 54 | A | AA |
| Example 29 | 10 | 65 | 25 | 5.0 | 100 | 1.0 | 75 | A | AAA |
| Comparative Example 8 | 0 | 0 | 100 | — | — | 0.1 | 1 | B | A |
| Comparative Example 9 | 0 | 0 | 100 | — | — | 0.1 | 1 | C | A |
| Comparative Example 10 | 63 | 31 | 16 | 2 | 7 | 0.1 | 4 | A | D |

TABLE 3-continued

| | | | | | | | | | |
|---|---|---|---|---|---|---|---|---|---|
| Comparative Example 11 | 63 | 25 | 12 | 1 | 5 | 0.1 | 3 | A | D |
| Comparative Example 12 | 95 | 5 | 0 | 0.5 | 3 | 0.1 | 2 | A | E |

As shown in Table 3, it was found from the comparison between the examples and the comparative examples that, when the average opening diameter of through holes is greater than 100 μm, coating properties are poor during the formation of active material layers, and there is a practical problem (Comparative Examples 8 and 9).

In addition, it was found that, when the proportion of through holes having an opening diameter of 5 μm or smaller exceeds 50%, adhesiveness to active material layers is poor (Comparative Examples 10 to 12).

In contrast, it was found that, when the average opening diameter of through holes is in a range of 1 μm to 100 μm, and the proportion of through holes having an opening diameter of 5 μm or smaller is 50% or lower, coating properties and adhesiveness become favorable (Examples 18 to 29).

Particularly, it was found from the comparison between Examples 18 to 25 that, when the proportion of through holes having an opening diameter of greater than 30 μm reaches 20% or higher, adhesiveness becomes more favorable.

In addition, it was found from the comparison between Examples 18 to 29 that, when the arithmetic average roughness Ra of the surface is high, adhesiveness becomes more favorable. Similarly, it was found that, when the occupancy of recess portions having an average opening diameter in a range of 0.1 μm to 100 μm is 10% or higher, adhesiveness becomes more favorable.

Example 30

An aluminum plate was produced using the same method as in Example 1 except for the fact that removal treatments of an oxidized film described in (c3) and (c4) below were carried out in this order instead of the removal treatment of oxidized films described in (c1).

(c3) Removal Treatment of Oxidized Films (Oxidized Film-Removing Step)

Next, the aluminum substrate that had been subjected to the electrolytic dissolution treatment was immersed in an aqueous solution (liquid temperature: 35° C.) having a caustic soda concentration of 5% by mass and an aluminum ion concentration of 0.5% by mass for 30 seconds, thereby dissolving and removing the oxidized film. After that, the aluminum substrate was washed with water by means of spraying.

(c4) Removal Treatment of Oxidized Films (Oxidized Film-Removing Step)

Next, the aluminum substrate that had been subjected to the removal treatment of oxidized films described in (c3) was immersed in a sulfuric acid aqueous solution (sulfuric acid concentration: 300 g/L, liquid temperature: 60° C.) for 60 seconds, thereby dissolving and removing the oxidized film.

After that, the aluminum substrate was washed with water by means of spraying and was dried, thereby producing an aluminum plate having through holes.

<Amount of Surface Oxygen Atom-Containing Coating>

For the aluminum plates produced in Examples 1 and 30, the etching duration necessary for the fragments of oxygen atom by means of ESCA to reach zero ("zero oxygen time" in Table 4 below) was measured using the above-described measurement device and method. The results are shown in Table 4.

<Production of Electrodes>

Conductive paint (VARNIPHITE T-602, manufactured by Nippon Graphite Industries, Ltd.) was applied onto a single surface of each of the aluminum plates produced in Examples 1 and 30 to a coating thickness of 3 μm and then was dried at reduced pressure under conditions of 200° C. and 24 hours, thereby forming a conductive layer.

Next, a slurry for forming an electrode active material layer which had been prepared in the following composition ratio was applied onto the formed conductive layer in a 14 mm×20 mm area using a die coater so as to obtain a total thickness of 65 μm.

After that, the slurry was dried at reduced pressure under conditions of 200° C. and 24 hours, an electrode active material layer was formed by means of pressing, thereby producing an electrode. The thickness (total thickness) of the obtained electrode active material layer was 46 μm.

| (Slurry for forming electrode active material layer) | |
|---|---|
| Polyvinylidene fluoride (manufactured by Kureha Corporation) | 6% by mass |
| Polyvinyl pyrrolidone (manufactured by Nippon Shokubai Co., Ltd.) | 3% by mass |
| Active charcoal "YP-50F" (manufactured by Kureha Corporation) | 81% by mass |
| Conductive assistant "DENKA BLACK battery grade" (manufactured by Denka Company Limited) | 6% by mass |

<Resistance Value>

Copper probes having 2.8 cmϕ were brought into close contact with the front and rear surfaces of an aluminum plate (electrode) on which a conductive layer and an electrode active material were formed by applying a load of 2.0 kgf/cm$^2$, and the resistance value was measured using a resistance meter (RESISTANCE HiTESTER 3541, manufactured by Hioki E.E. Corporation). The results are shown in Table 4 below.

TABLE 4

| | Zero oxygen time (min) | Resistance value (mΩ) |
|---|---|---|
| Example 1 | 15.0 | 42 |
| Example 30 | 11.5 | 13 |

From the results of Table 4, it was found that, when the etching duration necessary for the fragments of oxygen atom by means of ESCA to reach zero on the surface of the aluminum plate is 12 minutes or shorter, the resistance value decreases when the aluminum plate is used as an electrode.

The aluminum plate of the present invention can be used for, in addition to collectors for storage devices, heatresistance filters, oil-collecting filters, electrostatic filters, antibacterial filters, liquid-reforming filters, water electrolysis filters, exhaust gas-purifying filters, food filtration filters, marine life filtration filters, dust filters, DNA filters, fine powder classification filters, solid-liquid separation filters, deodorant filters, photocatalyst carriers, hydrogen-generating catalyst carriers, enzymatic electrodes, carriers of noble metal-absorbers, antibacterial carriers, adsorbents, absorbents, optical filters, near infrared cut filters, soundproof and sound-absorbing materials, electromagnetic shields, gas diffusion layers and separators in direct fuel batteries, networks for microorganism storage container oxygen supply openings, construction materials, and the like.

EXPLANATION OF REFERENCES

1: aluminum substrate
2: oxidized film
3: aluminum substrate having through holes
4: oxidized film having through holes
5: through hole
6: first metal layer
7: second metal layer
10: aluminum plate
11: aluminum substrate
12: radial drum roller
13a, 13b: main electrode
14: electrolysis treatment liquid
15: electrolytic solution supply opening
16: slit
17: electrolytic solution path
18: auxiliary anode
19a, 19b: thyristor
20: alternating-current power source
21: main electrolysis tank
22: auxiliary anode tank

What is claimed is:

1. An aluminum plate having an aluminum substrate having a plurality of through holes in a thickness direction,
wherein an average opening diameter of the through holes is in a range of 0.1 μm to 100 μm, and a proportion of through holes having an opening diameter of 5 μm or smaller in the through holes is more than 3% and 50% or lower, and
the aluminum plate further comprising unpenetrated recessed portions having an average opening diameter in a range of 0.1 μm to 100 μm,
wherein an occupancy of the recessed portions is 10% or greater,
a specific surface area ΔS of the surface is 5% or larger, and
wherein an etching duration necessary for an amount of oxygen atoms, which is measured by means of Electron Spectroscopy for Chemical Analysis after Ar ion etching is carried out on a surface of the aluminum plate, to reach 0% is 12 minutes or shorter;
here, the specific surface area ΔS refers to a value obtained from Expression (i) below using an actual area S, that is obtained from three-dimensional data, which is obtained by measuring specific surface areas using an atomic force microscope at 512×128 points in a 25 μm×25 μm range on the surface, using a three-point approximation method and a geometric measurement area $S_0$:

$$\Delta S=(S_x-S_0)/S_0\times100(\%) \quad (i).$$

2. The aluminum plate according to claim 1,
wherein a proportion of through holes having an opening diameter of larger than 30 μm in the through holes is 20% or greater.

3. The aluminum plate according to claim 2,
wherein an arithmetic average roughness Ra of a surface is 0.2 μm or greater.

4. The aluminum plate according to claim 1,
wherein an arithmetic average roughness Ra of a surface is 0.2 μm or greater.

5. An aluminum plate for a collector which is the aluminum plate according to claim 1.

6. A soundproof and sound-absorbing material which is the aluminum plate according to claim 1.

7. An electromagnetic shield which is the aluminum plate according to claim 1.

8. A construction material which is the aluminum plate according to claim 1.

9. The aluminum plate according to claim 1,
wherein a tensile strength of the aluminum substrate is in a range of 100 N/mm² to 350 N/mm².

10. The aluminum plate according to claim 1,
wherein an elongation of the aluminum substrate is in a range of 0.1% to 3.0%.

11. The aluminum plate according to claim 1,
wherein a number of intermetallic compounds in the aluminum substrate is in a range of 1000 compounds/mm² to 1000000 compounds/mm².

12. The aluminum plate according to claim 1,
wherein a proportion of through holes having an opening diameter of larger than 30 μm in the through holes is 20% to 60%.

* * * * *